A United States Patent
Hashimoto et al.

(10) Patent No.: US 7,128,989 B2
(45) Date of Patent: *Oct. 31, 2006

(54) MAGNETIC RECORDING MEDIUM

(75) Inventors: Hiroshi Hashimoto, Odawara (JP);
Katsuhiko Meguro, Odawara (JP);
Yuichiro Murayama, Odawara (JP);
Masahiko Mori, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/219,669

(22) Filed: Aug. 16, 2002

(65) Prior Publication Data

US 2003/0138667 A1    Jul. 24, 2003

(30) Foreign Application Priority Data

Aug. 20, 2001    (JP)    ............................. 2001-248641

(51) Int. Cl.
*G11B 5/66*    (2006.01)
*G11B 5/70*    (2006.01)

(52) U.S. Cl. ................................................. 428/844.5

(58) Field of Classification Search ............. 428/842.8, 428/844.5, 323, 328, 329, 425.9, 694 BA, 428/694 BS, 694 BM, 694 BU, 694 BL
See application file for complete search history.

(56) References Cited

U.S. PATENT DOCUMENTS 4,678,706 A  *  7/1987  Tokunaga et al. ............ 428/323
5,578,376 A  *  11/1996  Hashimoto et al. ......... 428/425.9
5,747,157 A  *  5/1998  Hashimoto et al. .......... 428/332
6,096,406 A  *  8/2000  Yamazaki et al. ........... 428/141
6,224,967 B1 *  5/2001  Murayama et al. .......... 428/216
6,780,503 B1 *  8/2004  Noguchi et al. ........... 428/842.8

FOREIGN PATENT DOCUMENTS

DE    4444927    *    6/1995

* cited by examiner

*Primary Examiner*—Holly Rickman
(74) *Attorney, Agent, or Firm*—Sughrue Mion, PLLC

(57) ABSTRACT

Provided is a magnetic recording medium having excellent dispersibility, smoothness and electromagnetic characteristics. The magnetic recording medium comprises at least one magnetic layer comprising a ferromagnetic powder and a binder on a nonmagnetic support. Said ferromagnetic powder is a ferromagnetic metal powder having an average major axis length of 10 to 80 nm and a crystallite size of 8 to 18 nm, or a ferromagnetic hexagonal ferrite powder having an average plate diameter of 5 to 40 nm, and said binder comprises 0.2 to 0.7 meq/g of at least one polar group selected from $-SO_3M$, $-OSO_3M$, $-PO(OM)_2$, $-OPO(OM)_2$ and $-COOM$ (where M denotes a hydrogen atom, alkali metal or ammonium salt), and/or 0.5 to 5 meq/g of at least one polar group selected from $-CONR_1R_2$, $-NR_1R_2$ and $-NR_1R_2R_3^+$ (where $R_1$, $R_2$ and $R_3$ independently denote hydrogen atoms or alkyl groups).

12 Claims, No Drawings

MAGNETIC RECORDING MEDIUM

FIELD OF THE INVENTION

The present invention relates to a magnetic recording medium having very excellent electromagnetic characteristics and running durability.

BACKGROUND OF THE INVENTION

Magnetic recording media in which a magnetic layer comprising ferromagnetic powder dispersed in binder is provided on nonmagnetic supports are widely employed in computer tapes and disks. In recent years, in the field of magnetic recording, the practice of digital recording, with its low recording deterioration, has developed from conventional analog recording. The recording of a larger volume of signals is generally required in digital recording than in analog recording, moreover, the recording and reproduction devices and the recording media employed are required to provide good picture and sound qualities as well as higher density recording as a result of the demand for smaller size and saving of space.

Recording signal wavelengths are being shortened and recording tracks are being narrowed to achieve high-density recording. Further improvement in electromagnetic characteristics is necessary in recording media. To improve electromagnetic characteristics, various methods such as improving magnetic characteristics of ferromagnetic powders, reducing the particle size, increasing the fill rate, and rendering the medium surface ultrasmooth have been proposed. However, these techniques have not been adequate to achieve the greater densities demanded in recent years.

When the recording wavelength is further shortened and the magnetic layer remains thick, the problems of self-demagnetization loss during recording and thickness loss during reproduction become pronounced. Further, the magnetic layer is being thinned to prevent saturation of the reproduction head. However, when the magnetic layer thickness is reduced to about 0.1 μm or less, the effects of the nonmagnetic support tend to appear on the surface of the magnetic layer, tending to affect electromagnetic characteristics and increase the error rate.

It is important to reduce the size of the magnetic material to reduce noise. Ferromagnetic metal powder with a major axis length equal to or less than 80 μm and ferromagnetic hexagonal ferrite micropowder with a plate diameter equal to or less than 40 nm are employed. However, such microgranular ferromagnetic powder tends to aggregate, and relative to the comparatively large ferromagnetic powder that has been employed thus far, tends to be much more difficult to disperse well.

Accordingly, it is an object of the present invention is to provide a magnetic recording medium having excellent dispersibility, smoothness and electromagnetic characteristics.

The present inventors conducted extensive research for achieving the above-stated object. As a result, they discovered that by employing microgranular magnetic material and a binder of prescribed polar group content in at least one magnetic layer, dispersibility of the microgranular ferromagnetic powder was improved, and moldability in the calendering step conducted to improve smoothness of the magnetic layer was improved; the present invention was devised on this basis.

SUMMARY OF THE INVENTION

That is, the object of the present invention is achieved by a magnetic recording medium (1) comprising at least one magnetic layer comprising a ferromagnetic powder and a binder on a nonmagnetic support, characterized in that said ferromagnetic powder is a ferromagnetic metal powder having an average major axis length of 10 to 80 nm and a crystallite size of 8 to 18 nm, or a ferromagnetic hexagonal ferrite powder having an average plate diameter of 5 to 40 nm, and said binder comprises 0.2 to 0.7 meq/g of at least one polar group selected from $-SO_3M$, $-OSO_3M$, $-PO(OM)_2$, $-OPO(OM)_2$ and $-COOM$ (where M denotes a hydrogen atom, alkali metal or ammonium salt), and/or 0.5 to 5 meq/g of at least one polar group selected from $-CONR_1R_2$, $-NR_1R_2$ and $-NR_1R_2R_3^+$ (where $R_1$, $R_2$ and $R_3$ independently denote hydrogen atoms or alkyl groups).

Preferred modes of the present invention are given below:

(2) The magnetic recording medium (1) described above in which said binder is polyurethane resin (A) obtained by reacting a polyol having a molecular weight of 500 to 5,000, a cyclic structure and an alkylene oxide chain; a chain-extending agent in the form of a polyol having a molecular weight of 200 to 500 and a cyclic structure; and organic polyisocyanate;

(3) The magnetic recording medium (1) described above in which said binder is polyurethane resin (B) obtained by reacting a polyester polyol comprised of an aliphatic dibasic acid and an aliphatic diol having an alkyl branch side chain but not having a cyclic structure; a chain-extending agent in the form of an aliphatic diol having a branch alkyl side chain with three or more carbon atoms; and an organic cyanate compound;

(4) The magnetic recording medium (1) described above in which said binder is polyurethane resin (C) obtained by reacting a polyol compound having a cyclic structure and an alkyl chain comprising two or more carbon atoms with organic diisocyanate;

(5) The magnetic recording medium (1) described above in which said binder is a vinyl chloride copolymer comprising at least 75 to 95 mass percent of vinyl chloride monomer units; and, (6) The magnetic recording medium (1) described above in which said binder is an acrylic copolymer comprising 1 to 75 mass percent of nitrogen-containing radical polymerizable monomer units, 1 to 75 mass percent of aromatic ring-containing radical polymerizable monomer units, and other radical polymerizable monomer units in a total of 100 mass percent.

The magnetic recording medium of the present invention will be described in greater detail below.

The present invention achieves noise reduction by employing in the magnetic layer a microgranular ferromagnetic powder, that is, a ferromagnetic metal powder, having an average major axis length of 10 to 80 nm and a crystallite size of 8 to 18 nm or hexagonal ferrite powder having an average plate diameter of 5 to 40 nm. However, since highly microgranular magnetic material has poor dispersibility and dispersion stability, as set forth above, it is difficult to achieve good dispersion even in conventionally employed binders comprising about 0.01 to 0.1 meq/g of polar groups (Japanese Examined Patent Publication (KOKOKU) Showa No. 58-41565). Accordingly, the content of polar groups has been increased in the present invention relative to that of conventionally employed binders to enhance the dispersibility of the microgranular magnetic material. Therefore, a magnetic recording medium with good electromagnetic characteristics can be obtained.

[Binder]

The binder employed in at least one magnetic layer of the present invention comprises 0.2 to 0.7 meq/g of at least one polar group selected from —$SO_3M$, —$OSO_3M$, —$PO(OM)_2$, —$OPO(OM)_2$ and —COOM (where M denotes a hydrogen atom, alkali metal or ammonium salt), and/or 0.5 to 5 meq/g of at least one polar group selected from —$CONR_1R_2$, —$NR_1R_2$ and —$NR_1R_2R_3^+$ (where $R_1$, $R_2$, and $R_3$ independently denote hydrogen atoms or alkyl groups). The term "alkyl group" as employed herein means a saturated hydrocarbon group with 1 to 18 carbon atoms, which may have a straight or branching chain structure.

The quantity of the at least one polar group selected from —$SO_3M$, —$OSO_3M$, —$PO(OM)_2$, —$OPO(OM)_2$ and —COOM (where M denotes a hydrogen atom, alkali metal or ammonium salt) is 0.2 to 0.7 meq/g, preferably 0.25 to 0.6 meq/g, and more preferably 0.3 to 0.5 meq/g. The content of the at least one polar group selected from —$CONR_1R_2$, —$NR_1R_2$, and —$NR_1R_2R_3^+$ (where $R_1$, $R_2$, and $R_3$ independently denote hydrogen atoms or alkyl groups) is 0.5 to 5 meq/g, preferably 1 to 4 meq/g, and more preferably 1.5 to 3.5 meq/g. When the contents of these polar groups fall outside the above-stated ranges, good dispersion of the microgranular magnetic material is precluded.

[Polyurethane Resin]

Examples of polyurethane resins suitable for use as the binder are:

(1) polyurethane resin (A), which is obtained by reacting a polyol with a molecular weight of 500 to 5,000 having a cyclic structure and an alkylene oxide chain; a chain-extending agent in the form of a polyol with a molecular weight of 200 to 500 having a cyclic structure; and organic polyisocyanate; and comprises 0.2 to 0.7 meq/g of at least one polar group selected from —$SO_3M$, —$OSO_3M$, —$PO(OM)_2$, —$OPO(OM)_2$ and —COOM (where M denotes a hydrogen atom, alkali metal or ammonium salt), and/or 0.5 to 5 meq/g of at least one polar group selected from —$CONR_1R_2$, —$NR_1R_2$ and —$NR_1R_2R_3^+$ (where $R_1$, $R_2$ and $R_3$ independently denote hydrogen atoms or alkyl groups);

(2) polyurethane resin (B), which is obtained by reacting a polyester polyol comprised of an aliphatic dibasic acid and an aliphatic diol having an alkyl branch side chain but not having a cyclic structure; a chain-extending agent in the form of an aliphatic diol having a branch alkyl side chain with three or more carbon atoms; and an organic isocyanate compound; and comprises 0.2 to 0.7 meq/g of at least one polar group selected from —$SO_3M$, —$OSO_3M$, —$PO(OM)_2$, —$OPO(OM)_2$ and —COOM (where M denotes a hydrogen atom, alkali metal or ammonium salt), and/or 0.5 to 5 meq/g of at least one polar group selected from —$CONR_1R_2$, —$NR_1R_2$ and —$NR_1R_2R_3^+$ (where $R_1$, $R_2$ and $R_3$ independently denote hydrogen atoms or alkyl groups); or (3) polyurethane resin (C), which is obtained by reacting a polyol compound having a cyclic structure and an alkyl chain comprising two or more carbon atoms with organic cyanate, and comprises 0.2 to 0.7 meq/g of at least one polar group selected from —$SO_3M$, —$OSO_3M$, —$PO(OM)_2$, —$OPO(OM)_2$ and —COOM (where M denotes a hydrogen atom, alkali metal or ammonium salt), and/or 0.5 to 5 meq/g of at least one polar group selected from —$CONR_1R_2$, —$NR_1R_2$ and —$NR_1R_2R_3^+$ (where $R_1$, $R_2$ and $R_3$ independently denote hydrogen atoms or alkyl groups).

Polyurethane Resin (A)

Compounds obtained by addition of a diol having a cyclic structure with an alkylene oxide such as ethylene oxide or propylene oxide may be employed as the polyol having a cyclic structure and an alkylene oxide chain serving as the starting material for polyurethane resin (A). Specific examples suitable for use are: bisphenol A, hydrogenated bisphenol A, bisphenol S, hydrogenated bisphenol S, bisphenol P, hydrogenated bisphenol P, tricyclodecane dimethanol, cyclohexane dimethanol, cyclohexane diol, 5,5'-(1-methylethylidene)bis-(1,1'-bicyclohexyl)-2-ol, 4,4'-(1-methylethylidene)bis-2-methylcyclohexanol, 5,5'-(1,1'-cyclohexylidene)bis-(1,1'-bicyclohexyl)-2-ol, 5,5'-(1,1'-cyclohexylmethylene)bis-(1,1'-bicyclohexyl)-2-ol, hydrogenated terpene diphenol, diphenylbisphenol A, diphenylbisphenol S, diphenylbisphenol P, 9,9-bis-(4-hydroxyphenyl)fluorene, 4,4'-(3-methylethylidene)bis(2-cyclohexyl-5-methylphenol), 4,4'-(3-methylethylidene)bis(2-phenyl-5-methylcyclohexanol), 4,4'-(1-phenylethylidene)bis(2-phenol), 4,4'-cyclohexylidenebis(2-methylphenol), terpene diphenol, and other diols. Of these, hydrogenated bisphenol A and polypropylene oxide adducts of hydrogenated bisphenol A are preferred. The molecular weight of this polyol is desirably 500 to 5,000. At 500 and above, the urethane group concentration is low, resulting in high solubility in solvent, and at 5,000 and below, coated film strength is good and durability is high.

The above-described diols having a cyclic structure as well as those added with an alkylene oxide such as ethylene oxide or propylene oxide within the molecular weight range of 200 to 500 may be employed as the chain-extending agent in the form of a polyol having a cyclic structure. Preferred examples are hydrogenated bisphenol A and propylene oxide adducts of hydrogenated bisphenol A.

Polyurethane Resin (B)

The polyester polyol serving as starting material for polyurethane resin (B) is comprised of an aliphatic dibasic acid and an aliphatic diol having an alkyl branch side chain but not having a cyclic structure. Examples of aliphatic dibasic acids suitable for use are succinic acid, adipic acid, azelaic acid, sebacic acid, malonic acid, glutaric acid, pimelic acid, and suberic acid. Of these, preferred acids are succinic acid, adipic acid, and sebacic acid. Of the total dibasic acid component of the polyester polyol, the content of the aliphatic dibasic acid is desirably equal to or greater than 70 mole percent. At equal to or greater than 70 mole percent, solvent solubility is high because the concentration of dibasic acid having a cyclic structure is essentially low, making it possible to effectively improve dispersibility.

Examples of aliphatic polyols having an alkyl branch side chain but not having a cyclic structure that can be employed in the polyester polyol are branched aliphatic diols such as: 2,2-dimethyl-1,3-propanediol, 3,3-dimethyl-1,5-pentanediol, 2-methyl-2-ethyl-1,3-propanediol, 3-methyl-3-ethyl-1,5-pentanediol, 2-methyl-2-propyl-1,3-propanediol, 3-methyl-3-propyl-1,5-pentanediol, 2-methyl-2-butyl-1,3-propanediol, 3-methyl-3-butyl-1,5-pentanediol, 2,2-diethyl-1,3-propanediol, 3,3-diethyl-1,5-pentanediol, 2-ethyl-2-butyl-1,3-propanediol, 3-ethyl-3-butyl-1,5-pentandediol, 2-ethyl-2-propyl-1,3-propanediol, 3-ethyl-3-propyl-1,5-pentanediol, 2,2-dibutyl-1,3-propanediol, 3,3-dibutyl-1,5-pentanediol, 2,2-dipropyl-1,3-propanediol, 3,3-dipropyl-1,5-pentanediol, 2-butyl-2-propyl-1,3-propanediol, 3-butyl-3- propyl-1,5-pentanediol, 2-ethyl-1,3-propanediol, 2-propyl-1,3-propanediol, 2-butyl-1,3-propanediol, 3-ethyl-1,5-pentanediol, 3-propyl-1,5-pentanediol, 3-butyl-1,5-pentanediol, 3-octyl-1,5-pentanediol, 3-myristyl-1,5-pentanediol, 3-stearyl-1,5-pentanediol, 2-ethyl-1,6-hexanediol, 2-propyl-1,6-hexanediol, 2-butyl-1,6-hexanediol, 5-ethyl-1,9-nonanediol, 5-propyl-1,9-nonanediol, and 5-butyl-1,9-nonanediol. Of these, 2,2-dimethyl-1,3-propanediol, 2-ethyl-2-butyl-1,3-propanediol, and 2,2-diethyl-1,3-propanediol are preferred. The content of the polyol having a branch side chain in the polyol employed in the polyester polyol is desirably 50 to 100 mole percent, more preferably 70 to 100 mole percent. Within this range, solubility in solvent is high and good dispersibility can be achieved.

An aliphatic diol having a branch alkyl side chain with three or more carbon atoms may be employed as the chain-extending agent in polyurethane resin (B). Having three or more carbon atoms and a branch alkyl side chain improves solubility in solvent and yields good dispersibility.

Examples of aliphatic diols having a branch alkyl side chain with three or more carbon atoms that are suitable for use are: 2-methyl-2-ethyl-1,3-propanediol, 3-methyl-3-ethyl-1,5-pentanediol, 2-methyl-2-propyl-1,3-propanediol, 3-methyl-3-propyl-1,5-pentanediol, 2-methyl-2-butyl-1,3-propanediol, 3-methyl-3-butyl-1,5-pentanediol, 2,2-diethyl-1,3-propanediol, 3,3-diethyl-1,5-pentanediol, 2-ethyl-2-butyl-1,3-propanediol, 3-ethyl-3-butyl-1,5-pentanediol, 2-ethyl-2-propyl-1,3-propanediol, 3-ethyl-3-propyl-1,5-pentanediol, 2,2-dibutyl-1,3-propanediol, 3,3-dibutyl-1,5-pentanediol, 2,2-dipropyl-1,3-propanediol, 3,3-dipropyl-1,5-pentanediol, 2-butyl-2-propyl-1,3-propanediol, 3-butyl-3-propyl-1,5-pentanediol, 2-ethyl-1,3-propanediol, 2-propyl-1,3-propanediol, 2-butyl-1,3-propanediol, 3-ethyl-1,5-pentanediol, 3-propyl-1,5-pentanediol, 3-butyl-1,5-pentanediol, 3-octyl-1,5-pentanediol, 3-myristyl-1,5-pentanediol, 3-stearyl-1,5-pentanediol, 2-ethyl-1,6-hexanediol, 2-propyl-1,6-hexanediol, 2-butyl-1,6-hexanediol, 5-ethyl-1,9-nonanediol, 5-propyl-1,9-nonanediol, and 5-butyl-1,9-nonanediol. Of these, 2-ethyl-2-butyl-1,3-propanediol and 2,2-diethyl-1,3-propanediol are preferred. The content in the polyurethane resin is desirably 5 to 30 mass percent, preferably 10 to 20 mass percent. Within this range, solubility in solvent is high and good dispersibility can be achieved.

Polyurethane Resin (C)

The polyol compound having a cyclic structure and an alkyl chain with two or more carbon atoms serving as the starting material for polyurethane resin (C) is desirably a diol with a molecular weight of 500 to 1,000. A diol is preferred because gelling due to crosslinking does not occur during polyurethane polymerization. When the diol comprises an alkyl chain with two or more carbon atoms, solubility in solvent is high and good dispersibility is achieved. A molecular weight equal to or higher than 500 results in good solubility in solvent due to the low urethane group concentration, and a molecular weight equal to or less than 1,000 results in good coated film strength. Desirable polyols having a cyclic structure and alkyl chains with two or more carbon atoms are the dimer diols denoted by the structure of the formula below obtained by hydrogenating and reducing dimer acids.

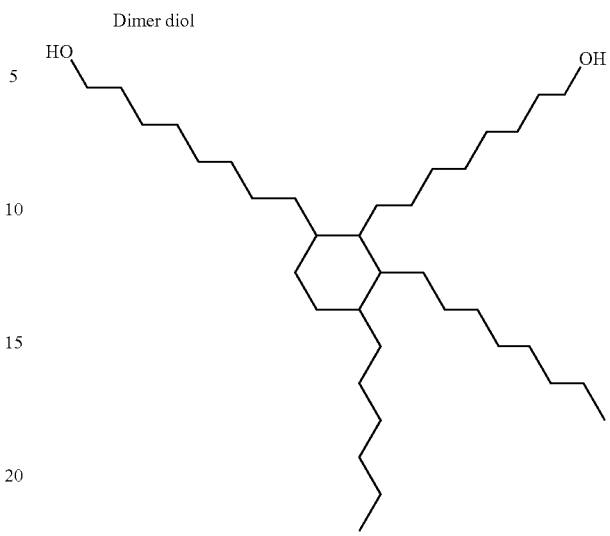

Dimer diol

The diol having a cyclic structure and an alkyl chain with two or more carbon atoms is desirably incorporated into the polyurethane resin in a proportion of 5 to 60 mass percent, preferably 10 to 40 mass percent. When the content of diol having a cyclic structure and an alkyl chain with two or more carbon atoms is within the stated range, solubility in solvent is high, good dispersibility is achieved, and durability is good.

In the present invention, the organic diisocyanate employed to form polyurethane resin by reaction with the above-described polyol is not specifically limited. Commonly employed organic diisocyanates may be employed. Specific examples are: hexanemethylene diisocyanate, tolidine diisocyanate, isophorone diisocyanate, 1,3-xylylene diisocyanate, 1,4-xylylene diisocyanate, cyclohexane diisocyanate, toluidine diisocyanate, 2,4-tolylene diisocyanate, 2,6-tolylene diisocyanate, 4,4'-diphenylmethane diisocyanate, p-phenylene diisocyanate, m-phenylene diisocyanate, 1,5-naphthalene diisocyanate, and 3,3-dimethylphenylene diisocyanate.

Polyurethane resin comprising polar groups can be manufactured by manufacturing polyurethane resin from starting material monomers into which polar groups have been incorporated. For example, the method can be employed such as (1) manufacturing polyurethane resin from a polar group-containing polyol such as a a polar group-containing polyester polyol or polyether polyol, a polyol such as non-polar group-containing polyester polyol or polyether polyol, and diisocyanate, and (2) converting some of the dihydric alcohol or dibasic acid to polar group-containing diol or polar group-containing dibasic acid. Examples of the polar group-containing polyol or polar group-containing dibasic acid are those comprising at least one polar group selected from —$SO_3M$, —$OSO_3M$, —$PO(OM)_2$, —$OPO(OM)_2$ and —COOM (where M denotes a hydrogen atom, alkali metal or ammonium salt), and/or at least one polar group selected from —$CONR_1R_2$, —$NR_1R_2$, and —$NR_1R_2R_3^+$ (where $R_1$, $R_2$ and $R_3$ independently denote hydrogen atoms or alkyl groups) in a main chain or side chain of the above-described polyol or dibasic acid.

The average molecular weight of the polar group-containing polyurethane resin employed in the present invention is desirably 5,000 to 100,000, preferably 10,000 to 50,000.

At 5,000 or greater, physical strength, such as obtained magnetic coated film strength, is high, and the magnetic recording medium has a good durability. At a molecular weight equal to or less than 100,000, solubility in solvent is high and dispersibility is improved. Further, the coating material viscosity becomes suitable at a prescribed concentration, workability is good, and handling is facilitated.

To improve curing properties and durability, the polar group-containing polyurethane resin employed in the present invention desirably comprises a branch OH group in a proportion of 2 to 40 groups per molecule, preferably 3 to 20 groups per molecule.

Polyurethane resins other than the above-described polyurethane resins may also be employed in the present invention.

The polyurethane resins employed together desirably have the same polar groups as the above-described polyurethane resins. Substances per se known such as polyhydric alcohols, aliphatic polyamines, alicyclic polyamines, and aromatic polyamines may be employed as chain-extending agents. Of these, polyhydric alcohols with molecular weights of 50 to 500 are preferred. A molecular weight of 50 or greater yields a coated film of good strength and durability. A molecular weight of 500 or less yields a coated film with a high Tg and good durability resulting from good hardness. Examples of preferred polyhydric alcohols are: bisphenol A, hydrogenated bisphenol A, bisphenol S, bisphenol P, ethylene oxides thereof, propylene oxide adducts, cyclohexane dimethanol, cyclohexane diol, hydroquinone, bis(2-hydroxyethyl)tetrabromobisphenol A, bis(2-hydroxyethyl)tetrabromobisphenol S, bis(2-hydroxyethyl) tetramethylbisphenol S, bis(2-hydroxyethyl) diphenylbisphenol S, bis(2-hydroxyethyl) diphenylbisphenol, bis(2-hydroxyethyl)thiodiphenol, bis(2-hydroxyethyl)bisphenol F, biphenol, bisphenolfluorene, bisphenolfluorene dihydroxyethylether, and other short-chain diols having a cyclic structure. Examples of greater preference are aromatic or alicyclic diols such as: bisphenol A, hydrogenated bisphenol A, bisphenol S, bisphenol P, ethylene oxide and propylene oxide adducts thereof, cyclohexane dimethanol, and cyclohexane diol.

[Vinyl Chloride Resins]

Vinyl chloride resins may be employed as the binder in the present invention. Various monomers copolymerized with vinyl chloride monomer may be employed as the vinyl chloride resin.

Examples of copolymerization monomers that are suitable for use are fatty acid vinyl esters such as vinyl acetate and vinyl propionate; acrylates and methacrylates such as methyl (meth)acrylate, ethyl (meth)acrylate, isopropyl (meth)acrylate, butyl (meth)acrylate, and benzyl (meth) acrylate; alkyl allyl ethers as allyl methyl ether, allyl ethyl ether, allyl propyl ether, and allyl butyl ether; styrene; α-methyl styrene; vinylidene chloride; acrylonitride; ethylene; butadiene; and acrylamide. Examples of copolymerization monomers having functional groups that are suitable for use are: vinyl alcohol, 2-hydroxyethyl (meth)acrylate, polyethyleneglycol (meth)acrylate, 2-hydroxypropyl (meth) acrylate, 3-hydroxypropyl (meth)acrylate, polypropyleneglycol (meth)acrylate, 2-hydroxyethylallylether, 2-hydroxypropylallylether, 3-hydroxypropylallylether, p-vinylphenol, maleic acid, maleic anhydride, acrylic acid, methacrylic acid, glycidyl (meth)acrylate, allyl glycidyl ether, phosphoethyl (meth)acrylate, sulfoethyl (meth)acrylate, p-styrenesulfonic acid, and Na and K salts thereof.

A proportion of vinyl chloride monomers in the vinyl chloride resin of 75 to 95 weight percent is desirable because dynamic strength is high, solvent solubility is good, and magnetic material dispersibility is good.

[Acrylic Resins]

Acrylic copolymers comprising a total of 100 mass percent in the form of 1 to 75 mass percent of nitrogen-containing radical polymerizable monomer units, 1 to 75 mass percent of aromatic ring-containing radical polymerizable monomer units, and other radical polymerizable monomer units, and comprising at least one polar group selected from $-SO_3M$, $-OSO_3M$, $-PO(OM)_2$, $-OPO(OM)_2$ and $-COOM$ (where M denotes a hydrogen atom, alkali metal or ammonium salt), and/or at least one polar group selected from $-CONR_1R_2$, $-NR_1R_2$, and $-NR_1R_2R_3^+$ (where $R_1$, $R_2$ and $R_3$ independently denote hydrogen atoms or alkyl groups) may be employed as the binder in the present invention. "(Meth)acrylamide" is a general term for acrylamides and methacrylamides and "(meth)acrylate" is a general term for acrylates and methacrylates.

Examples of nitrogen-containing radical polymerizable monomer units that can be employed in the present invention are: (meth)acrylamides, diacetone (meth)acrylamide, N-methylol (meth)acrylamide, N-methoxymethyl (meth) acrylamide, N-ethoxymethyl (meth)acrylamide, N-butoxymethyl (meth)acrylamide, N,N-dimethylaminopropyl (meth)acrylamide, N-isopropylacrylamide, and other (meth) acrylamides; N,N-dimethylaminomethyl (meth)acrylate, N,N-dimethylaminoethyl (meth)acrylate, N,N-diethylaminomethyl (meth)acrylate, N,N-diethylaminoethyl (meth) acrylate, N,N-dimethylaminopropyl (meth)acrylate, (meth) acryloylmorpholine, morpholinoethyl (meth)acrylate, and other (meth)acrylates; N-vinyloxazolidone, N-vinyl-2-pyrrolidone, N-vinylcarbazol, 2-vinyl-4,6-diamino-5-triazine, 2-vinylpyridine, 4-vinylpyridine, maleimide, N-phenylmaleimide, acrylonitrile, and other vinyl compounds. Particularly preferred nitrogen-containing radical polymerizable monomer units are N,N-dimethylaminopropylacrylamide, N-isopropylacrylamide, and diacetoneacrylamide. The proportion of nitrogen-containing radical polymerizable monomer units is desirably 1 to 75 mass percent, more preferably 5 to 60 mass percent. Within this range, the dispersibilities of the nonmagnetic powder and magnetic powder can be improved.

Aromatic ring-containing (meth)acrylate units may be employed as the aromatic ring-containing radical polymerizable monomer employed in the present invention. Examples of aromatic ring-containing (meth)acrylate units are benzyl (meth)acrylate, phenoxyethyl (meth)acrylate, phenoxypolyethyleneglycol (meth)acrylate, and nonylphenolethyleneoxide adduct (meth)acrylates. Particularly preferred aromatic ring-containing (meth)acrylate units are benzyl (meth)acrylate and phenoxyethyl (meth)acrylate. The proportion of the (meth)acrylate units containing aromatic rings is desirably 1 to 75 mass percent, preferably 5 to 60 mass percent. At 1 mass percent and above, the dispersibility of the nonmagnetic powder or magnetic powder can be improved, and adequate smoothness (gloss) and durability are achieved in the coated film. At 75 mass percent and below, a suitable coating material viscosity is achieved.

Examples of other copolymerizable monomer units with nitrogen-containing radical polymerizable monomer units and aromatic ring-containing radical polymerizable monomer units are: methyl (meth)acrylate, ethyl (meth)acrylate, propyl (meth)acrylate, butyl (meth)acrylate, isobutyl (meth)

acrylate, pentyl (meth)acrylate, hexyl (meth)acrylate, octyl (meth)acrylate, 2-ethylhexyl (meth)acrylate, lauryl (meth)acrylate, stearyl (meth)acrylate, cyclohexyl (meth)acrylate, and other alkyl (meth)acrylate monomers; methoxyethyl (meth)acrylate, butoxyethyl (meth)acrylate, and other alkoxyalkyl (meth)acrylates; glycidyl (meth)acrylate, allyl glycidyl ether, methyl vinyl ether, ethyl vinyl ether, isobutyl vinyl ether, n-butyl vinyl ether, 2-ethyl hexyl vinyl ether, n-octyl vinyl ether, lauryl vinyl ether, cetyl vinyl ether, stearyl vinyl ether, and other alkyl vinyl ethers; vinyl acetate; vinyl propionate; (anhydrous) maleic acid; acrylonitrile; vinylidene chloride; and the like. These monomers may be employed singly or in combinations of two or more.

The number average molecular weight of the above-described acrylic resin is desirably 1,000 to 200,000, preferably 10,000 to 100,000. At 1,000 and above, the physical strength of the magnetic coated film is high and the durability of magnetic tapes and the like is good. At 200,000 and below, the viscosity of the coated film is low, workability is good, and handling is facilitated.

The following methods may be employed to introduce polar groups into the vinyl chloride resin and the acrylic resin having polar groups that are employed in the present invention.

Synthesis may be conducted by addition of the above-described polar groups through reaction to vinyl chloride resin or acrylic resin comprised of vinyl chloride copolymer or nitrogen-containing radical polymerizable monomer units and aromatic ring-containing radical polymerizable monomer units not containing at least one polar group selected from —$SO_3M$, —$OSO_3M$, —$PO(OM)_2$, —$OPO(OM)_2$, and —COOM (where M denotes a hydrogen atom, alkali metal, or ammonium salt) and/or at least one polar group selected from —$CONR_1R_2$, —$NR_1R_2$, and —$NR_1R_2R_3^+$ (where $R_1$, $R_2$, and $R_3$ independently denote hydrogen atoms or alkyl groups). Specifically, when introducing —$SO_3M$ to vinyl chloride resin or acrylic resin, for example, vinyl chloride monomer or nitrogen-containing radical polymerizable monomer units and aromatic ring-containing radical polymerizable monomer units are first copolymerized with glycidyl group-containing copolymerizable compounds and, as needed, other compounds capable of copolymerizing therewith, and, simultaneously with copolymerization, or after obtaining the copolymer, a —$SO_3M$-containing compound is reacted therewith to introduce polar groups. Examples of copolymerizable compounds for introducing glycidyl groups are glycidyl (meth)acrylate and glycidyl vinyl ether. These may be employed singly or in combinations of two or more.

The copolymerizable polar group-containing compound may be copolymerized with vinyl chloride monomers, or nitrogen-containing radical copolymerizable monomer units and aromatic ring-containing radical copolymerizable monomer units, or some other copolymerizable compounds. Examples of the copolymerizable polar group-containing compound are copolymerizable compounds containing at least one polar group selected from —$SO_3M$-$OSO_3M$, —$PO(OM)_2$, —$OPO(OM)_2$, and —COOM (where M denotes a hydrogen atom, alkali metal, or ammonium salt) and/or at least one polar group selected from —$CONR_1R_2$, —$NR_1R_2$, and —$NR_1R_2R_3^+$ (where $R_1$, $R_2$, and $R_3$ independently denote hydrogen atoms or alkyl groups). Examples of the copolymerizable compound for introducing —$SO_3M$ are 2-acrylamide-2-methylpropanesulfonic acid, vinyl sulfonate, (meth)acrylsulfonic acid, p-styrenesulfonic acid, other unsaturated hydrocarbon sulfonic acids, salts thereof, (meth)acrylic acid sulfoethyl ester, (meth)acrylic acid sulfopropyl ester, other (meth)acrylic acid sulfoalkyl esters, and salts thereof. The above hydrophilic polar groups may be employed singly or in combinations of two or more. When the introduction of —$NR_2$ is necessary in addition to —$SO_3M$, a copolymerizable compound containing —$NR_2$, specifically, N,N-dimethylaminopropylacrylamide, N-isopropylacrylamide, or the like, may be employed.

In the course of manufacturing a copolymer, the method of employing a polar group-containing radical polymerization initiator to induce copolymerization of the monomer mixture, or the method of copolymerizing the mixture of monomers in the presence of a chain-transfer agent having a polar group on one end may be employed to introduce a polar group. Examples of polar group-containing radical polymerization initiators are ammonium persulfate, potassium persulfate, and sodium persulfate. The quantity of these radical polymerization initiators employed is desirably 1 to 10 mass percent, preferably 1 to 5 mass percent, of the total quantity of monomers. The chain transfer agent having a polar group on one end is not specifically limited and compounds with a polar group on one end and being capable of chain transfer in a polymerization reaction are mentioned; examples are halide compounds, mercapto compounds, and diphenyl picryl hydrazine having polar groups on one end. Specific examples of halide compounds are 2-chloroethanesulfonic acid, sodium 2-chloroethanesulfonate, 4-chlorophenylsulfoxide, 4-chlorobenzenesulfonamide, p-chlorobenzenesulfonic acid, sodium p-chlorobenzenesulfonate, sodium 2-bromoethanesulfonate, and sodium 4-(bromomethyl)benzenesulfonate. The preferred compounds are sodium 2-chloroethanesulfonate and sodium p-chlorobenzenesulfonate. Preferred mercapto compounds suitable for use are 2-mercaptoethanesulfonic acid (salt), 3-mercapto-1,2-propanediol, mercaptoacetic acid (salt), 2-mercapto-5-benzoimidazolesulfonic acid (salt), 3-mercapto-2-butanol, 2-mercaptobutanol, 3-mercapto-2-propanol, N-(2-mercaptopropyl)glycine, thioglucolic acid ammonium, and β-mercaptoethylaminohydrochloride. These chain transfer agents having a polar group on one end may be employed singly or in combinations of two or more. A particularly preferred chain transfer agent with polar groups on one end is 2-mercaptoethanesulfonic acid (salt) having a strong polarity. The quantity of these chain transfer agents employed is preferably 0.1 to 10 mass percent, more preferably 0.2 to 5 mass percent, of the total quantity of monomer.

The incorporation of hydroxyl groups is desirable in addition to the at least one polar group selected from —$SO_3M$-$OSO_3M$, —$PO(OM)_2$, —$OPO(OM)_2$, and —COOM (where M denotes a hydrogen atom, alkali metal, or ammonium salt) and/or at least one polar group selected from —$CONR_1R_2$, —$NR_1R_2$, and —$NR_1R_2R_3^+$ (where $R_1$, $R_2$, and $R_3$ independently denote hydrogen atoms or alkyl groups). Examples of copolymerizable hydroxyl group-containing units are: hydroxyethyl (meth)acrylate, hydroxypropyl (meth)acrylate, polyethyleneglycolmono (meth)acrylate, polypropyleneglycolmono (meth)acrylate, polyethyleneglycol polypropyleneglycolmono (meth)acrylate, glycerolmono (meth)acrylate, 3-chloro-2-hydroxypropyl (meth)acrylate, and other hydroxyalkyl (meth)acrylates; hydroxyethylvinyl ether, hydroxypropylvinyl ether, hydroxybutylvinyl ether, and other vinyl ethers; hydroxyethylmono (meta)allyl ether, hydroxypropylmono (meta)allyl ether, hydroxybutylmono (meta)allyl ether, diethyleneglycolmono (meta)allyl ether, dipropyleneglycol mono (meta)allyl ether, glycerinemono (meta)allyl ether, 3-chloro-2-hydroxypropyl (meta)allyl ether, and other (meta)allyl ethers; and (meta)allyl alcohols. Vinyl alcohol units can be incorporated by copolymerizing vinyl acetate and employing a saponification reaction based on a caustic alkali in solvent. The quantity of monomer having hydroxyl groups is desirably 5 to 30 mass percent of the total monomer.

The polymerization reaction system containing the above-described polymerized compounds and chain transfer agent can be polymerized by known polymerization methods, such as suspension polymerization, emulsion polymerization, and solution polymerization. Of these polymerization methods, the use of suspension polymerization and emulsion polymerization, with their good drying operation properties, is desirable, and the use of emulsion polymerization is particularly desirable, from the viewpoint of permitting ready storage of acrylic copolymer obtained in solid form with high storage stability. The polymerization conditions vary with the type of polymerizable compounds, polymerization initiator, type of chain transfer agent, and the like. However, conditions within the autoclave of a temperature of about 50 to 80° C., a gauge pressure of about 4.0 to 1.0 MPa, and a duration of 5 to 30 hours are desirable. Polymerization is desirably conducted in an atmosphere of gas that is inert with respect to the reaction to facilitate control of the reaction. Examples of such gases are nitrogen and argon, with the use of nitrogen being preferred for reasons of economy. During polymerization, other components in addition to those described above may be added to the above-described polymerization reaction system. Examples of such components are emulsifiers, electrolytes, and polymer protective colloids.

In the present invention, the above-described polyurethane resin, vinyl chloride resin, and acrylic resin may be employed in combination, and other binders having polar groups in quantities equal to or less than the equivalent quantities of the total of these components may also be employed together.

Other resins that can be employed together are not specifically limited. Known thermoplastic resins, thermosetting resins, reactive resins and mixtures thereof that have been conventionally employed as a binder, may be employed. The thermoplastic resins have a glass transition temperature of −100 to 150° C., a number average molecular weight of 1,000 to 200,000, preferably from 10,000 to 100,000. Examples are polymers and copolymers comprising structural units in the form of vinvlidene chloride, acrylonitrile, styrene, butadiene, ethylene, vinyl butyral, vinyl acetal, and vinyl ether; and various rubber resins. Further, examples of thermosetting resins and reactive resins are phenol resins, phenoxy resins, epoxy resins, urea resins, melanine resins, alkyd resins, acrylic reactive resins, formaldehyde resins, silicone resins, epoxy polyamide resins, and mixtures of polyester resins and isocyanate prepolymers.

The above-described binder may be employed within a range of 5 to 50 mass parts per 100 mass parts of the ferromagnetic powder or nonmagnetic powder. In particular, limiting the content thereof to 7 to 45 mass parts increases the glossiness of the surface of the magnetic layer or nonmagnetic layer. Therefore it is found that the dispersion of the ferromagnetic powder or nonmagnetic powder is good. Further limiting the content thereof to 10 to 40 mass parts substantially improves electromagnetic characteristics. When the content is less than 40 mass parts, the ferromagnetic powder or nonmagnetic powder is not bound and powder drop out tends to occur, and when blended in a proportion greater than 200 mass parts, there is no further improvement in the dispersion of the ferromagnetic powder or nonmagnetic powder, the fill rate of ferromagnetic powder in the magnetic layer diminishes, and electromagnetic characteristics sometimes deteriorate.

[Ferromagnetic Powder]

The ferromagnetic powder employed in at least one magnetic layer in the present invention is a ferromagnetic metal powder having an average major axis length of 10 to 80 nm and a crystallite size of 8 to 18 nm, or a ferromagnetic hexagonal ferrite powder having an major plate diameter of 5 to 40 nm. A magnetic recording medium having high surface smoothness and good electromagnetic characteristics can be obtained by employing microgranular magnetic material.

Ferromagnetic Metal Powder

The ferromagnetic metal powder employed in the present invention is not specifically limited with the exception that it contains Fe (containing an alloy) as a main component. Preferred ferromagnetic metal powders are ferromagnetic alloy powders having a main component in the form of $\alpha$-Fe. In addition to prescribed atoms, the ferromagnetic powder may comprise the following atoms: Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, and B. The incorporation of at least one from among Al, Si, Ca, Y, Ba, La, Nd, Co, Ni, and B in addition to $\alpha$-Fe is desirable. In particular, the incorporation of Co, Al and Y is preferred. More specifically, it is preferred that Co content ranges from 10 to 40 atomic percent, Al content ranges from 2 to 20 atomic percent, and Y content ranges from 1 to 15 atomic percent relative to Fe. These ferromagnetic powders may be pretreated with dispersants, lubricants, surfactants, antistatic agents, and the like prior to dispersion. Further, the ferromagnetic metal powder may comprise a small quantity of water, hydroxides or oxides. The moisture content of the ferromagnetic powder desirably ranges from 0.01 to 2 percent; the moisture content of the ferromagnetic powder is desirably optimized by means of the type of binder.

The major axis length of the ferromagnetic metal powder is 10 to 80 nm, preferably 25 to 75 nm, and still more preferably, 35 to 70 nm. When the major axis length is less than 10 nm, the orientation of the magnetic material decreases and SQ and magnetic characteristics deteriorate. When it exceeds 80 nm, the size of the magnetic material increases and suitability to high-density recording is lost.

The crystallite size is 8 to 18 nm, preferably 9 to 16 nm, and more preferably, 10 to 15 nm. When the crystallite size is less than 8 nm, it becomes difficult to produce uniform magnetic material, and when the crystallite size exceeds 18 nm, the size of the magnetic material becomes excessive and suitability to high-density recording is lost.

The major axis length can be obtained both by the method of taking pictures by transmission electron microscope and directly reading the minor axis length and major axis length of the ferromagnetic powder therefrom, or by the method of reading by tracing a photograph taken by transmission electron microscope with an image analyzer IBASSI made by Carl Zeiss Co. The crystallite size employed is the average value obtained by the Scherrer method from the half peak width of the diffraction peak under conditions of a CuK$\alpha$1 radiation source, tube voltage of 50 kV, and tube current of 300 mA with an X-ray diffractometer (RINT 2000 Series made by Rigaku Denki).

The specific surface area ($S_{BET}$) as measured by the BET method of the ferromagnetic powder employed in the magnetic layer of the present invention is equal to or higher than 30 and less than 80 m$^2$/g, preferably 38 to 48 m$^2$/g. Thereby, good surface property and low noise can be compatible.

The pH of the ferromagnetic powder is preferably optimized based on the combination of binders employed. The range is 4 to 12, preferably 7 to 10. As needed, the surface of the ferromagnetic powder may be treated with Al, Si, P, or oxides thereof, and the like. The quantity thereof ranges from 0.1 to 10 percent with respect to the ferromagnetic powder. It is preferable that a surface treatment is applied, because the adsorption of lubricants such as fatty acids becomes equal to or less than 100 mg/m$^2$. Inorganic ions of soluble Na, Ca, Fe, Ni, Sr, and the like are sometimes incorporated into the ferromagnetic powder. Characteristics are not particularly affected when the quantity thereof is equal to or less than 200 ppm. Further, there are desirably few pores in the ferromagnetic powder employed in the present invention; the level thereof is equal to or less than 20 volume percent, preferably equal to or less than 5 volume percent.

The shape may be acicular, granular, rice-particle shaped, or plate-shaped so long as the above-stated characteristics about particle size are satisfied. The use of acicular ferromagnetic powder is particularly preferred. In the case of acicular ferromagnetic metal powder, the acicular ratio is preferably 4 to 12, more preferably 5 to 12.

The coercive force Hc of the ferromagnetic metal powder preferably ranges from 159 to 239 kA/m (2,000 to 3,000 Oe), more preferably 167 to 231 kA/m (2,100 to 2,900 Oe). The saturation magnetic flux density preferably ranges from 100 to 300 mT (1,000 to 3,000 G), more preferably 160 to 280 mT (1,600 to 2,800 G). The σ s preferably ranges from 140 to 170 A·m$^2$/kg (140 to 170 emu/g), more preferably 145 to 160 A·m$^2$/kg (145 to 160 emu/g).

Ferromagnetic Hexagonal Ferrite Powder

The average plate diameter of the ferromagnetic hexagonal ferrite powder employed in the present invention is 5 to 40 nm, preferably 10 to 35 nm, and still more preferably 15 to 30 nm. In particular, when reproducing with a magnetoresistive head to increase track density, noise must be kept low. At a plate diameter less than 5 nm, stable magnetization cannot be achieved due to thermal fluctuation, and at higher than 40 nm, noise increases. Both are not suitable for high-density magnetic recording. A plate ratio (plate diameter/plate thickness) of 1 to 15 is desirable and 1 to 7 is preferred. Low plate ratio is desirable because of high fill property in the magnetic layer, but adequate orientation cannot be achieved. A plate ratio higher than 15 increases noise by stacking of particles. The specific surface area by BET method within the above-mentioned particle size ranges from 10 to 200 m$^2$/g. The specific surface area almost corresponds to an arithmetic value from the particle plate diameter and the plate thickness. Narrow distributions of particle plate diameter and thickness are normally preferred. Although difficult to render in number form, 500 particles can be randomly measured in a TEM photograph of particles to make a comparison. This distribution is often not a normal distribution. However, when expressed as the standard deviation to the average size, σ/average size=0.1 to 2.0. The particle producing reaction system is rendered as uniform as possible and the particles produced are subjected to a distribution-enhancing treatment to achieve a sharp particle size distribution. For example, methods such as selectively dissolving ultrafine particles in an acid solution are known.

The coercive force (Hc) measured in the magnetic material can be made about 39.8 to 398 kA/m (500 to 5,000 Oe). The higher the coercive force (Hc), the greater the advantages for high-density recording, but this is limited by the capacity of the recording head. In the present invention, the Hc is about 159 to 239 kA/m (2,000 to 3,000 Oe), preferably 175 to 223 kA/m (2,200 to 2,800 Oe). If the saturation magnetization of the head exceeds 1.4 T, 159 kA/m (2,000 Oe) or higher is preferred. The Hc can be controlled by the particle size (plate diameter and plate thickness), the type and quantity of elements incorporated, the substitution sites of the elements, particle production reaction conditions, and the like. The saturation magnetization σ s is 40 to 80 A·m$^2$/kg. The higher the σ s, the greater the advantages, but it tends to decrease as particles being smaller. Known methods of improving σ s are combining spinel ferrite with magnetoplumbite ferrite, selection of the type and quantity of elements incorporated, and the like. It is also possible to employ W-type hexagonal ferrite.

Methods of manufacturing hexagonal ferrite include (1) the glass crystallization method in which a metal oxide substituted with barium oxide, iron oxide, and iron, and a glass-forming substance in the form of boron oxide or the like are mixed in proportions designed to yield a desired ferrite composition, melted, and quenched to obtain an amorphous product, subjected to a heat treatment again, washed, and pulverized to obtain barium ferrite crystal powder; (2) the hydrothermal reaction method in which a barium ferrite composition metal salt solution is neutralized with an alkali, the by-products are removed, the solution is liquid-phase heated at equal to or higher than 100° C., and the solution is washed, dried, and pulverized to obtain barium ferrite crystal powder; and (3) the coprecipitation method in which a barium ferrite composition metal salt solution is neutralized with an alkali, the by-products are removed, and the solution is dried, processed at equal to or less than 1,100° C., and pulverized to obtain barium ferrite crystal powder. However, any methods may be employed in the present invention.

When dispersing the magnetic material, the particle surface of the magnetic material is also treated with a dispersion medium or substance conforming to the polymer.

Inorganic and organic compounds are employed as a surface treatment agent. Examples of the principal compounds are compounds of Si, Al, P and the like; various silane coupling agents; and various titanium coupling agents. The quantity ranges from 0.1 to 10 percent relative to the magnetic material. The pH of the magnetic material is also important to dispersion. A pH of 4 to 12 is usually optimum for the dispersion medium and polymer. From the perspective of the chemical stability and storage properties of the medium, about 6 to 11 is selected. Moisture contained in the magnetic material also affects dispersion. There is an optimum level for the dispersion medium and polymer, usually selected from 0.01 to 2.0 percent.

[Nonmagnetic Powder]

The magnetic recording medium of the present invention can comprise a lower nonmagnetic coating layer comprising a binder and a nonmagnetic powder on a nonmagnetic support.

Nonmagnetic powders suitable for use in the lower nonmagnetic layer can be either inorganic substances or organic substances. Further, carbon black and the like can be employed. Examples of the inorganic substance are metals, metal oxides, metal carbonates, metal sulfates, metal nitrides, metal carbides, metal sulfides and the like. Specific examples are titanium oxides such as titanium dioxide, cerium oxide, tin oxide, tungsten oxide, ZnO, $ZrO_2$, $SiO_2$, $Cr_2O_3$, α-alumina having an α-conversion rate of 90 to 100 percent, β-alumina, γ-alumina, α-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and titanium carbide; these may be employed singly or in combination. Of these, α-iron oxide and titanium oxide are preferred. The shape of the nonmagnetic powder may be any of acicular, spherical, polyhedral, or plate-shaped. The crystallite size of the nonmagnetic powder preferably ranges from 4 nm to 1 μm, more preferably 40 nm to 100 nm. the crystallite size equal to or higher than 4 nm permits good dispersibility, and the crystallite size equal to or less than 1 μm permits good surface smoothness. The average particle diameter of the nonmagnetic powder preferably ranges from 5 nm to 2 μm, more preferably 100 to 200 nm, but nonmagnetic powders of differing partice size may be combined as needed, or the particle diameter distribution of a single nonmagnetic powder may be broadened to achieve the same effect. The average particle diameter equal to or higher than 5 nm permits good dispersibility, and the average particle diameter equal to or less than 2 μm permits good surface smoothness.

The specific surface area of the nonmagnetic powder preferably ranges from 1 to 100 $m^2/g$, more preferably 5 to 70 $m^2/g$, still more preferably 10 to 65 $m^2/g$. The specific surface area equal to or higher than 1 $m^2/g$ permits high surface smoothness, and the specific surface area equal to or less than 100 $m^2/g$ permits good dispersibility, for example, dispersion is possible with a desired quantity of binder.

The oil absorption capacity using dibutyl phthalate (DBP) ranges from 5 to 100 ml/100 g, preferably from 10 to 80 ml/100 g, further preferably from 20 to 60 ml/100 g. The specific gravity ranges from 1 to 12, preferably from 3 to 6. The tap density ranges from 0.05 to 2 g/ml, preferably from 0.2 to 1.5 g/ml. Good operation properties can be achieved because scattered particles decrease at equal to or higher than 0.05 g/ml, and adhesion to the device does not occur at equal to or less than 2 g/ml.

The pH of the nonmagnetic powder preferably ranges from 2 to 11, more preferably from 6 to 9. Low coefficient of friction is achieved at high temperature and high humidity at the pH equal to or higher than 2, and free fatty acids increase and the coefficient of friction tends to decrease at the pH equal to or less than 11.

The moisture content of the nonmagnetic powder ranges from 0.1 to 5 mass percent, preferably from 0.2 to 3 mass percent, further preferably from 0.3 to 1.5 mass percent. The moisture content equal to or higher than 0.1 mass percent permits good dispersibility, and the moisture content equal to or less than 5 mass percent permits the stable viscosity of coating material after dispersion. The ignition loss is preferably equal to or less than 20 mass percent, with small ignition loss being preferred. If the nonmagnetic powder is an inorganic powder, the Mohs' hardness is preferably 4 to 10. There is a tendency that durability cannot be ensured if the Mohs' hardness is less than 4. The stearic acid (SA) adsorption capacity of the nonmagnetic powders ranges from 1 to 20 $\mu mol/m^2$, preferably from 2 to 15 $\mu mol/m^2$. The heat of wetting in 25° C. water of the nonmagnetic powder is preferably within the range of 20 to 60 $\mu J/cm^2$ (200 to 600 $erg/cm^2$). A solvent with a heat of wetting within this range may also be employed. The quantity of water molecules on the surface at 100 to 400° C. suitably ranges from 1 to 10 pieces per 100 Angstroms. The pH of the isoelectric point in water preferably ranges from 3 to 9.

The surface of these nonmagnetic powders is preferably treated with $Al_2O_3$, $SiO_2$, $TiO_2$, $ZrO_2$, $SnO_2$, $Sb_2O_3$, and ZnO. The surface-treating agents of preference with regard to dispersibility are $Al_2O_3$, $SiO_2$, $TiO_2$, and $ZrO_2$, and $Al_2O_3$, $SiO_2$ and $ZrO_2$ are further preferable. They may be employed singly or in combination. Depending on the objective, a surface-treatment coating layer with a coprecipitated material may also be employed, the coating structure which comprises a first alumina coating and a second silica coating thereover or the reverse structure thereof may also be adopted. Depending on the objective, the surface-treatment coating layer may be a porous layer, with homogeneity and density being generally desirable.

Specific examples of nonmagnetic powders suitable for use in the lower layer of the present invention are: Nanotite from Showa Denko K. K.; HIT-100 and ZA-G1 from Sumitomo Chemical Co., Ltd.; DPN-250, DPN-250BX, DPN-245, DPN-270BX, DPN-550BX and DPN-550RX from Toda Kogyo Corp.; titanium oxide TTO-51B, TTO-55A, TTO-55B, TTO-55C, TTO-55S, TTO-55D, SN-100, MJ-7, α-iron oxide E270, E271 and E300 from Ishihara Sangyo Co., Ltd.; STT-4D, STT-30D, STT-30 and STT-65C from Titan Kogyo K. K.; MT-100S, MT-100T, MT-150W, MT-500B, MT-600B, MT-100F and MT-500HD from Tayca Corporation; FINEX-25, BF-1, BF-10, BF-20 and ST-M from Sakai Chemical Industry Co., Ltd.; DEFIC-Y and DEFIC-R from Dowa Mining Co., Ltd.; AS2BM and TiO2P25 from Nippon Aerogil; 100A and 500A from Ube Industries, Ltd.; Y-LOP from Titan Kogyo K. K.; and sintered products of the same. Particular preferable nonmagnetic powders are titanium dioxide and α-iron oxide.

Carbon black may be combined with nonmagnetic powder in the lower nonmagnetic layer to reduce surface electrical resistivity (Rs), reduce optical transmittance, and achieve a desired micro Vickers hardness. The micro Vickers hardness of the lower nonmagnetic layer is usually 25 to 60 $kg/mm^2$, preferably 30 to 50 $kg/mm^2$ to adjust head contact. It can be measured with a thin film hardness meter (HMA-400 from NEC Corporation) using a diamond triangular needle with a tip radius of 0.1 μm and an edge angle of 80 degrees as indenter tip. The optical transmittance is generally standardized to an infrared absorbance at a wavelength of about 900 nm equal to or less than 3 percent. For example, in a VHS magnetic tape, it has been standardized to equal to or less than 0.8 percent. To this end, furnace black for rubber, thermal for rubber, black for coloring, acetylene black and the like may be employed.

The specific surface area of carbon black employed in the nonmagnetic layer in the present invention ranges from 100 to 500 $m^2/g$, preferably from 150 to 400 $m^2/g$ and the DBP oil absorption capacity ranges from 20 to 400 ml/100 g, preferably from 30 to 200 ml/100 g. The particle diameter of carbon black ranges from 5 to 80 nm, preferably from 10 to 50 nm, further preferably from 10 to 40 nm. It is preferable for carbon black that the pH ranges from 2 to 10, the moisture content ranges from 0.1 to 10 percent and the tap density ranges from 0.1 to 1 g/ml. Specific examples of types of carbon black suitable for use in the present invention are: BLACK PEARLS 2000, 1300, 1000, 900, 800, 880, 700 and VULCAN XC-72 from Cabot Corporation; #3050B, #3150B, #3250B, #3750B, #3950B, #950, #650B, #970B, #850B and MA-600 from Mitsubishi Chemical Corporation; CONDUCTEX SC, RAVEN 8800, 8000, 7000, 5750, 5250, 3500, 2100, 2000, 1800, 1500, 1255 and 1250 from Columbia Carbon Co., Ltd.; and Ketjen Black EC from Lion Akzo Co., Ltd. The carbon black employed can be surface treated with a dispersing agent or the like, grafted with a resin, or a portion of the surface may be graphite-treated. Further, the carbon black may be dispersed with a binder prior to being added to the coating material. These types of carbon black are employed in a range that does not exceed 50 mass percent with respect to the inorganic powder above and does not exceed 40 percent with respect to the total mass of the nonmagnetic layer. These types of carbon black may be employed singly or in combination. The *Carbon Black Handbook* compiled by the Carbon Black Association may be consulted for types of carbon black suitable for use in the nonmagnetic layer of the present invention.

Based on the objective, an organic powder may be added to the nonmagnetic layer. Examples are acrylic styrene resin powders, benzoguanamine resin powders, melamine resin powders, and phthalocyanine pigments. Polyolefin resin powders, polyester resin powders, polyamide resin powders, polyimide resin powders, and polyfluoroethylene resins may also be employed.

Additives imparting dispersive, lubricating, antistatic, and plastic effects may be incorporated into the magnetic layer or lower nonmagnetic layer in the magnetic recording medium of the present invention. Examples of these additives are molybdenum disulfide, tungsten disulfide, graphite, boron nitride, graphite fluoride, silicone oil, polar group-containing silicone, fatty acid-modified silicone, fluorosilicone, fluoroalcohol, fluoroesters, polyolefins, polyglycols, polyphenyl ethers, phenyl phosphonate, benzyl phosphonate groups, phenethylphosphonic acid, α-methylbenzylphosphonic acid, 1-methyl-1-phenethylsulfonic acid, diphenylmethylphosphonic acid, biphenylphosphonic acid, benzylphenylphosphonic acid, α-cumylphosphonic acid, toluylphosphonic acid, xylylphosphonic acid, ethylphenylphospnonic acid, cumenylphosphonic acid, propylphenylphosphonic acid, butylphenylphosphonic acid, heptylphenylphosphonic acid, octylphenylphosphonic acid, nonylphenylphosphonic acid, other aromatic ring-containing organic phosphonic acids, alkali metal salts thereof, octylphosphonic acid, 2-ethylhexylphosphonic acid, isooctylphosphonic acid, (iso)nonylphosphonic acid, (iso)decylphosphonic acid, (iso)undecylphosphonic acid, (iso)dodecylphosphonic acid, (iso)hexadecylphosphonic acid, (iso)octadecylphosphonic acid, (iso)eicosylphosphonic acid, other alkylphosphonic acids, alkali metal salts thereof, phenyl phosphate, benzyl phosphate, phenethyl phosphate, α-methylbenzyl phosphate, 1-methyl-1-phenethyl phosphate, diphenylmethyl phosphate, biphenyl phosphate, benzylphenyl phosphate, α-cumyl phosphate, toluyl phosphate, xylyl phosphate, ethylphenyl phosphate, cumenyl phosphate, propylphenyl phosphate, butylphenyl phosphate, heptylphenyl phosphate, octylphenyl phosphate, nonylphenyl phosphate, other aromatic phosphoric acid esters, alkali metal salts thereof, octyl phosphate, 2-ethylhexyl phosphate, isooctyl phosphate, (iso)nonyl phosphate, (iso)decyl phosphate, (iso)undecyl phosphate, (iso)dodecyl phosphate, (iso)hexadecyl phosphate, (iso)octadecyl phosphate, (iso)eicosyl phosphate, other phosphoric acid alkyl esters, alkali metal salts thereof, alkylsulfonic acid esters, alkali metal salts thereof, fluoroalkylsulfuric acid esters, alkali metal salts thereof, lauric acid, myristic acid, palmitic acid, stearic acid, behenic acid, butyl stearate, oleic acid, linolic acid, linolenic acid, elaidic acid, erucic acid, other monobasic fatty acids comprising 10 to 24 carbon atoms and optionally comprising unsaturated bonds and branches, metal salts thereof, butyl stearate, octyl stearate, amyl stearate, isooctyl stearate, octyl myristate, butyl laurate, butoxyethyl stearate, anhydrosorbitan monostearate, anhydrosorbitan distearate, anhydrosorbitan tristearate, other monofatty esters, difatty esters, or polyfatty esters comprising a monobasic fatty acid having 10 to 24 carbon atoms and optionally comprising unsaturated bonds and branches and any one from among a monohydric to hexahydric alcohol having 2 to 12 carbon atoms and optionally comprising unsaturated bonds and branches, alkoxy alcohols having 12 to 22 carbon atoms and optionally comprising unsaturated bonds and branches, and monoalkyl ethers of alkylene oxide polymers; fatty acid amides comprising 2 to 22 carbon atoms, and fatty acid amines comprising 8 to 22 carbon atoms. Compounds comprising alkyl groups, aryl groups, and aralkyl groups substituted with groups other than the above-mentioned hydrocarbon groups such as nitro groups or hydrocarbon groups containing halogens such as F, Cl, Br, $CF_3$, $CCl_3$, and $CBr_3$ may also be employed. Further, nonionic surfactants such as alkylene oxid-based one, glycerine-based one, glycidol-based one and alkyl phenol ethylene oxide adducts; cationic surfactants such as cyclic amines, ester amides, quaternary ammonium salts, hydantoin derivatives, heterocycles, phosphoniums, and sulfoniums; anionic surfactants such as carboxylic acids, sulfonic acids, sulfuric esters, and other acid group-comprising compounds; and amphoteric surfactants such as amino acids, aminosulfonic acids, sulfuric and phosphoric acid esters of aminoalcohols, and alkyl betaines may also be employed. These surfactants are described in detail in, "A Handbook of Surfactants" (published by Sangyo Tosho K.K.). These lubricants, antistatic agents, and the like need not necessarily be pure, and may comprise isomers, unreacted products, side-products, decomposition products, oxides, and other impurities in addition to the principal components. The impurities desirably constitute equal to or less than 30 mass percent, preferably equal to or less than 10 mass percent.

Specific examples are: NAA-102, hydrogenated castor oil fatty acid, NAA-42, Cation SA, Nymeen L-201, Nonion E-208, Anon BF and Anon LG manufactured by NOF Corporation; FAL-205 and FAL-123 manufactured by Takemoto Oil & Fat Co., Ltd.; NJLUB OL manufactured by New Japan Chemical Co. Ltd.; TA-3 manufactured by Shin-Etsu Chemical Co. Ltd.; Armide P manufactured by Lion Armour Co., Ltd.; Duomine TDO manufactured by Lion Corporation; BA-41G manufactured by Nisshin Oil Mills, Ltd.; and Profan 2012E, Newpole PE61 and Ionet MS-400 manufactured by Sanyo Chemical Industries, Ltd.

The dispersants, lubricants, and surfactants employed in the present invention may be employed differently as needed in the nonmagnetic layer and magnetic layer based on the type and quantity of compound being employed. By way of example (and thus not by way of limitation), dispersants have the property of being adsorbed or bound by polar groups. They adsorb or bind chiefly by the above-mentioned polar groups to the surface of the ferromagnetic powder in the magnetic layer, and to the surface of the nonmagnetic powder in the nonmagnetic layer. It has been conjectured that organic phosphorus compounds that have adsorbed tend to hardly desorb from the surfaces of metals, metallic compounds, and the like. Accordingly, the ferromagnetic and nonmagnetic powder surfaces may be covered with alkyl groups, aromatic groups or the like in the present invention to improve affinity with the binder resin components of the ferromagnetic powder and nonmagnetic powder and further enhance the dispersion stability of the ferromagnetic powder and nonmagnetic powder. Further, lubricants in the form of fatty acids may be present in a free state. Therefore, the following methods are conceivable; fatty acids of different melting points are employed in the nonmagnetic layer and magnetic layer to prevent bleeding onto the surface; bleeding onto the surface is controlled by using esters with different boiling points and polarities; the quantity of surfactants employed is adjusted to improve coating stability; and a large quantity of lubricant is used in the nonmagnetic layer to improve lubricating effects. Further, some or all of the additives employed in the present invention may be added at any step during the manufacturing of the coating liquids for the magnetic layer or lower layer. For example, there are cases when combined with the ferromagnetic powder prior to the kneading step, cases when added during the kneading step with the ferromagnetic powder, the binder and the solvent, cases when added during the dispersion step, cases when added after the dispersion stop, and cases when added immediately prior to coating.

A coating liquid prepared from the above-described materials is coated on a nonmagnetic support to form the nonmagnetic layer or magnetic layer.

[Nonmagnetic Support]

Nonmagnetic supports suitable for use in the present invention include known supports such as biaxially oriented polyethylene napthalate, polyethylene terephthalate, polyamide, polyimide, polyamideimide, aromatic polyamide, and polybenzoxidazole. Polyethylene naphthalate and aromatic polyamide are preferred. These nonmagnetic supports may be in advance subjected to corona discharge, plasma treatment, adhesion-enhancing treatment, heat treatment, or the like. It is further desirable for a nonmagnetic support suitable for use in the present invention to have a surface with good smoothness in the form of a centerline average surface roughness falling within a range of 0.1 to 20 nm, preferably 1 to 10 nm, at a cutoff value of 0.25 mm. It is further desirable for these nonmagnetic supports to have not only a low centerline average surface roughness, but also to have no rough protrusions of 1 μm or greater.

The support obtained preferably has an arithmetic average roughness (Ra) [JIS B0660-1998, ISO 4287-1997] equal to or less than 0.1 μm because the magnetic recording medium obtained exhibits low noise. The nonmagnetic support preferably has a thickness ranging from 3 to 80 μm in the magnetic recording medium of the present invention.

[Backcoat Layer, Undercoat Layer]

A backcoat layer may be provided on the side of the nonmagnetic support employed in the present invention on which the magnetic coating material is not applied. The usual backcoat layer is a layer provided by coating on the side of the nonmagnetic support on which the magnetic coating material is not applied a backcoat layer coating material obtained by dispersing granular components such as abrasives and antistatic agents and a binder in an organic solvent. Examples of the granular components suitable for use are various inorganic pigments and carbon black. Examples of the binder are nitrocellulose, phenoxy resins, vinyl chloride resins, polyurethane, and other resins. They may be employed singly or in combination. An adhesive layer may be provided on the coating surfaces of the magnetic coating material on the nonmagnetic support and the backcoat layer forming coating material. In the magnetic recoding medium of the present invention, an undercoat layer may be provided. Providing the undercoat layer permits improved adhesion between the support and the magnetic layer or the lower nonmagnetic layer. A polyester resin having solubility to a solvent may be employed as the undercoat layer. The thickness of the undercoat layer may be equal to or less than 0.5 μm, for example.

[Manufacturing Method]

As an example of the method of manufacturing the magnetic recording medium of the present invention, a magnetic coating liquid is coated to the prescribed thickness on the surface of the nonmagnetic support while running. In this case, plural magnetic layer coating liquids may be coated sequentially or simultaneously, and the nonmagnetic layer coating liquid and the magnetic layer coating liquid may be coated sequentially or simultaneously. Coating machines suitable for use in applying the magnetic coating material or the nonmagnetic layer coating material mentioned above are air doctor coaters, blade coaters, rod coaters, extrusion coaters, air knife coaters, squeeze coaters, immersion coaters, reverse roll coaters, transfer roll coaters, gravure coaters, kiss coaters, cast coaters, spray coaters, spin coaters, and the like. For example, "Recent Coating Techniques" (May 31, 1983), issued by the Sōgō Gijutsu Center (K.K.) may be referred to in this regard. The followings are examples of coating devices and methods applicable to the magnetic recording medium of the present invention.

(1) A method in which the lower layer is first applied with a coating device commonly employed to apply magnetic coating materials such as a gravure coating, roll coating, blade coating, or extrusion coating device, and the upper layer is applied while the lower layer is still wet by means of a support pressure extrusion coating device such as is disclosed in Japanese Examined Patent Publication (KOKOKU) Heisei No. 1-46186 and Japanese Unexamined Patent Publication (KOKAI) Showa No. 60-238179 and Japanese Unexamined Patent Publication (KOKAI) Heisei No. 2-265672;

(2) A method in which the upper and lower layers are applied nearly simultaneously by a single coating head having two built-in slits for passing coating liquid, such as is disclosed in Japanese Unexamined Patent Publication (KOKAI) Showa No. 63-88080, Japanese Unexamined Patent Publication (KOKAI) Heisei No. 2-17971, and Japanese Unexamined Patent Publication (KOKAI) Heisei No. 2-265672; and (3) A method in which the upper and lower layers are applied nearly simultaneously using an extrusion coating apparatus with a backup roller as disclosed in Japanese Unexamined Patent Publication (KOKAI) Heisei No. 2-174965.

The thickness of the magnetic layer of the medium of the present invention is optimized based on the saturation magnetization level and head gap length of the head employed and the recorded signal band, and is normally 0.01 to 0.10 μm, preferably 0.02 to 0.08 μm, more preferably 0.03 to 0.08 μm. It is also possible to separate the magnetic layer into two or more layers having different magnetic characteristics, and to suitably employ configurations relating to known multilayer magnetic layers. The magnetic layer is desirably coated by wet-on-wet method through the lower nonmagnetic layer comprising an inorganic powder on the support to coat the ultrathin magnetic layer stably. In magnetic tapes, the ferromagnetic powder contained in the magnetic coated layer is longitudinally oriented by magnetic field with cobalt magnets or solenoids. For disks, although adequate isotropic orientation can sometimes be achieved where there is no orientation without using an orienting device, the use of a known random orienting device wherein cobalt magnets are alternately positioned at angles or an alternating current magnetic field is applied by a solenoid is desirable. Generally, isotropic orientation preferably refers to, in the case of ferromagnetic metal micropowder, in-plane two-dimensional randomness, but a vertical component can also be imparted and three-dimensional randomness achieved. In the case of hexagonal ferrite, it is generally easy to achieve in-plane and vertical three-dimensional randomness, but in-plane two-dimensional randomness is also possible. Further, known methods such as two-pole opposed magnets can be employed to impart vertical orientation, thereby imparting isotropic magnetic characteristics in a circumferential direction. In particular, during high-density recording, vertical orientation is desirable. Further, circumferential orientation may also be imparted by spin coating. The temperature and flow volume of the drying air, and coating rate are desirably controlled to control the drying position of the coating. The coating rate preferably ranges from 20 to 1,000 m/min, and the temperature of the drying air is preferably equal to or higher than 60° C. It is also possible to conduct suitable predrying prior to entering the magnet zone.

After drying, the coating layer may be processed for surface smoothness. For example, super calender rolls or the like may be employed in the surface smoothness treatment. Processing the surface for smoothness eliminates voids generated by elimination of the solvent during drying and increases the fill rate of ferromagnetic powder in the magnetic layer, yielding a magnetic recording medium with good electromagnetic characteristics. The calendering rolls employed may be heat-resistant plastic rolls of epoxy, polyimide, polyamide, or polyamideimide. Processing may also be conducted with metal rolls. The magnetic recording medium of the present invention desirably has a surface with extremely good smoothness in the form of a centerline average roughness of 0.1 to 4 nm, preferably 1 to 3 nm, at a cutoff value of 0.25 mm. The method comprises selecting specific ferromagnetic powders and binders such as those set forth above, forming a magnetic layer, and calendering it as set forth above. Calendering is preferably conducted under the condition of a calender roll temperature of 60 to 100° C., preferably 70 to 100° C., and still more preferably 80 to 100° C., and a pressure of 100 to 500 kg/cm, preferably 200 to 450 kg/cm, and more preferably 300 to 400 kg/cm. The magnetic recording medium obtained is cut to the desired size by a cutter or the like for use.

In the magnetic recording medium of the present invention, because the particles of magnetic material employed in the magnetic layer of the present invention are extremely small and numerous hydrophilic polar groups are incorporated into the binder, water adsorbing on the surface of the magnetic material and the trace amount of moisture in the coating liquid solvent tend to be retained. Thus, it is considered that the binder tends to plastically flow even after drying of the magnetic layer, improving formability during the calendering step.

Embodiment

Synthesis examples of the polyurethane resin, vinyl chloride resin (copolymer), and acrylic resin (copolymer) employed as binders; specific embodiments employing these resins; and comparative examples are given below. However, the present invention is not limited to these embodiments. The "parts" given in the embodiments are "mass parts" unless specifically indicated otherwise.

SYNTHESIS EXAMPLE PUA-1

Synthesis of Polyurethane Resin PUA-1

A polyether polyol of the composition shown in Table 1 and a short-chain diol having a cyclic structure were dissolved at 60° C. under a nitrogen gas flow to prepare a 30 percent cyclohexanone solution in a vessel equipped with temperature gauge, stirrer, and reflux cooler that had been backfilled in advance with nitrogen gas. A 60 ppm quantity of dibutyltin dilaurate was then added as catalyst and the mixture was further dissolved for 15 min. The organic diisocyanate compound shown in Table 1 was then added and the mixture was reacted with heating for 6 hours, yielding polyurethane resin PUA-1. The hydrophilic polar group (—$SO_3Na$) content of the polyurethane resin PUA-1 obtained was 0.287 meq/g.

SYNTHESIS EXAMPLES PUA-2, PUa-3, PUC-1, PUc-2

Synthesis of PUA-2, PUa-3, PUC-1, PUc-2

In the same manner as in Synthesis Example PUA-1, the chain extending agents and organic diisocyanate compounds shown in Table 1 were employed to obtain polyurethane resins PUA-2, PUa-3, PUC-1, and PUc-2. The hydrophilic polar group (—$SO_3Na$) contents of the polyurethane resins PUA-2, PUa-3, PUC-1, and PUc-2 are given in Table 1.

SYNTHESIS EXAMPLE PUB-1

(1) Synthesis of Polyester Polyol A

To a reaction vessel equipped with temperature gauge, stirrer, and reflux cooler, 365 parts of adipic acid and 260 parts of neopentyl glycol were charged. 2 mass percent quantity of zinc acetate and 3 mass percent quantity of sodium acetate were added as catalysts, a transesterification was conducted for 3 hours at 180 to 220° C., and a polycondensation was conducted for 2 hours at a reduced pressure of 1 to 10 mmHg. Polyester polyol A was thus obtained.

(2) Synthesis of Polyurethane Resin PUB-1

Next, the polyester polyol obtained as set forth above was employed, and in the same manner as in Embodiment PUA-1, the chain extending agent and organic diisocyanate compound indicated in Table 1 were employed to obtain polyurethane resin PUB-1. The hydrophilic polar group (—$SO_3Na$) content of the polyurethane resin PUB-1 obtained was 0.339 eq/g.

SYNTHESIS EXAMPLES PUB-2, PUB-3, AND PUb-4

Synthesis of Polyurethane Resins PUB-2, PUB-3, and PUb-4

In the same manner as in Synthesis Example PUB-1, the polyester A, chain extending agent, and organic diisocyanate compound indicated in Table 1 were used to prepared polyurethane resins PUB-2, PUB-3, and PUb-4. The hydrophilic polar group (—$SO_3Na$) content of the polyurethane resins PUB-2, PUB-3, and PUb-4 obtained are given in Table 1.

SYNTHESIS EXAMPLE PVC-1

Synthesis of Vinyl Chloride Resin PVC-1

To a polymerization reaction vessel, 130 parts of deionized water, 117 parts of methanol, 0.6 part of methyl cellulose, 0.2 part of polyoxyethylenesorbitan fatty acid partially esterified compound, and 0.52 part of trichloroethylene were charged. After evacuating the gas within the system under reduced pressure, the vinyl chloride monomer, glycidyl allyl ether, and 2-hydroxypropyl methacrylate shown in Table 1 were introduced and the mixture was stirred at 60° C. Subsequently, 0.42 part of 3,3,5-trimethylhexanoyl peroxide was added and polymerization was initiated. Simultaneously, a solution of 8 parts of sodium p-styrenesulfonate dissolved in 40 parts of methanol was continuously added at a fixed rate designed to complete addition of the entire solution in 8 hours. After the reaction had progressed for 12 hours, the polymerization reaction vessel was cooled when the pressure therein reached 3 kg/cm$^2$, yielding vinyl chloride resin PVC-1. The hydrophilic polar group (—SO$_3$Na) content of the vinyl chloride resin PVC-1 obtained was 0.336 meq/g.

SYNTHESIS EXAMPLE PVC-2, pvc-3

Synthesis of Vinyl Chloride Resin PVC-2 and pvc-3

In the same manner as in Synthesis Example PVC-1, the vinyl chloride monomer shown in Table 2 and other radical polymerizable monomer units were employed to prepare vinyl chloride resins PVC-2 and pvc-3. The hydrophilic polar group (—SO$_3$Na) contents of the vinyl chloride resins PVC-2 and pvc-3 obtained are given in Table 1.

SYNTHESIS EXAMPLE AC-1

Synthesis of Acrylic Resin AC-1

A polymerization vessel equipped with stirrer, condenser, temperature gauge, and nitrogen gas introduction inlet was backfilled with nitrogen and heated to 60° C. A solution of the benzyl methacrylate, diacetoneacrylamide, and 2-hydroxyethyl methacrylate shown in Table 3 dissolved in 100 parts of cyclohexanone and a solution of 0.5 part of 2,2'-azobisisobutyronitrile dissolved in 10 parts of cyclohexanone were simultaneously and uniformly added dropwise to the above polymerization vessel over a period of 2 hours. With completion of the dropwise addition, the mixture was heated at 60° C. for 4 hours to complete polymerization, yielding acrylic resin AC-1. The hydrophilic polar group (amide group) content of the vinyl chloride resin PVC-1 obtained was 0.50 meq/g.

SYNTHESIS EXAMPLES AC-2 THROUGH 7, Ac-8, AND AC9 THROUGH 10

Synthesis of Acrylic Resins AC-2 through 7, Ac-8, and AC9 through 10

In the same manner as in Synthesis Example AC-1, copolymerization was conducted with the monomer types and ratios (mass parts) shown in Table 3 and a reaction was conducted in the same manner as above, yielding acrylic resins AC-2 through 7, Ac-8, and AC9 through 10. The hydrophilic polar group (—SO$_3$Na, amide group, amino group, PO(OH)$_2$, COONa) contents of acrylic resins AC-2 through 7, Ac-8, and AC9 through 10 obtained are given in Table 3.

[Embodiment 1]

Preparation of upper nonmagnetic layer coating liquid

| | |
|---|---|
| Acicular ferromagnetic metal powder | 100 parts |
| Composition: Fe/Co/Al/Y = 62/25/5/8 | |
| Surface treatment agent: Al$_2$O$_3$, Y$_2$O$_3$ | |
| Hc: 167 kA/m (2,100 Oe) | |
| Crystallite size: 11 nm | |
| Major axis length: 60 nm | |
| Acicular ratio: 6 | |
| BET specific surface area: 70 m$^2$/g | |
| σ s: 110 A · m$^2$/kg (110 emu/g) | |

-continued

| | |
|---|---|
| Polyurethane resin PUA-1 (described in Table 1) | 15 parts |
| Phenylphosphorous acid | 3 parts |
| α-Al$_2$O$_3$ (particle size: 0.15 μm) | 2 parts |
| Carbon black (particle size: 20 nm) | 2 parts |
| Cyclohexanone | 110 parts |
| Methyl ethyl ketone | 100 parts |
| Toluene | 100 parts |
| Butyl stearate | 2 parts |
| Stearic acid | 1 part |

Preparation of lower nonmagnetic layer coating liquid

| | |
|---|---|
| Nonmagnetic inorganic powder | 85 parts |
| α-iron oxide | |
| Surface treatment agent: Al$_2$O$_3$, SiO$_2$ | |
| Major axis length: 0.15 μm | |
| Tap density: 0.8 | |
| Acicular ratio: 7 | |
| BET specific surface area: 52 m$^2$/g | |
| pH: 8 | |
| DBP oil absorption capacity: 33 g/100 g | |
| Carbon black | 20 parts |
| DBP oil absorption capacity: 120 ml/100 g | |
| pH: 8 | |
| BET specific surface area: 250 m$^2$/g | |
| Volatile content: 1.5 percent | |
| Polyurethane resin PUA-1 (described in Table 1) | 15 parts |
| Phenylphosphorous acid | 3 parts |
| α-Al$_2$O$_3$ (particle size: 0.2 μm) | 1 part |
| Cyclohexanone | 140 parts |
| Methyl ethyl ketone | 170 parts |
| Butyl stearate | 2 parts |
| Stearic acid | 1 part |

Each component of the upper magnetic layer coating material and lower nonmagnetic layer coating material was kneaded in an open kneader and dispersed in a sand mill for 120 min. To the dispersions obtained, 6 parts of trifunctional low molecular weight polyisocyanate compound (Coronate 3041, made by Nippon Polyurethane) were added, the mixtures were stirred another 20 min, and the mixtures were passed through a filter with an average pore size of 1 μm to prepare magnetic and nonmagnetic coating materials. The nonmagnetic coating material was applied in a quantity calculated to yield a dry thickness of 1.8 μm and the magnetic coating material was applied immediately thereafter in a quantity calculated to yield a dry thickness of 0.08 μm in simultaneous multilayer coating. Before the two layers had dried, orientation was conducted with a 300 mT (3,000 Gauss) magnet. Once the coatings had dried, calendering was conducted with a seven-stage calender comprising only metal rolls at a speed of 100 m/min, a linear pressure of 300 kg/cm, and a temperature of 90° C. to smoothen the surface. The product was then heat cured for 24 hours at 70° C. and slit to a width of 3.8 mm to prepare a magnetic tape.

[Embodiments 2 to 19]

The magnetic materials and polyurethane resins were changed as shown in Table 4, and Embodiments 2 to 19 were manufactured by the same method as in Embodiment 1.

COMPARATIVE EXAMPLES 1 TO 6

The magnetic materials and polyurethane resins were changed as shown in Table 4, and Comparative Examples 1 to 6 were manufactured by the same method as in Embodiment 1.

[Embodiment 20]

Changing the magnetic material to the following one, Embodiment 14 was manufactured.

Preparation of upper magnetic layer coating liquid

| | |
|---|---|
| Plate-shaped ferromagnetic hexagonal ferrite powder | 100 parts |
| Composition other than oxygen (molar ratio): Ba/Fe/Co/Zn = 1/9/0.2/1 | |
| Hc: 15.9 kA/m (200 Oe) | |
| Plate diameter: 25 nm | |
| Plate ratio: 3 | |
| BET specific surface area: 80 m$^2$/g | |
| σ s: 50 A · m$^2$/kg (50 emu/g) | |
| Polyurethane resin PUA-1 (described in Table 2) | 15 parts |
| Phenylphosphorous acid | 3 parts |
| α-Al$_2$O$_3$ (particle size: 0.15 μm) | 2 parts |
| Carbon black (particle size: 20 nm) | 2 parts |
| Cyclohexanone | 110 parts |
| Methyl ethyl ketone | 100 parts |
| Toluene | 100 parts |
| Butyl stearate | 2 parts |
| Stearic acid | 1 part |

Each component of the upper magnetic layer coating material was processed in the same manner as in Embodiment 1 to prepare magnetic coating materials. Nonmagnetic coating material identical to that employed in Embodiment 1 was then applied in a quantity calculated to yield a dry thickness of 1.5 μm, immediately after which the magnetic coating material was applied in a quantity calculated to yield a dry thickness of 0.08 μm in simultaneous multilayer coating on a polyethylene terephthalate support with a thickness of 62 μm and a center surface average surface roughness of 3 μm. While both layers were still wet, random orientation was conducted by passing the product through two devices generating alternating magnetic fields with a frequency of 50 Hz and a magnetic field strength of 25 mT (250 Gauss) and with a frequency of 50 Hz and a magnetic field strength of 12 mT (120 Gauss). The product was then processed in a seven-stage calender at 90° C. and a linear pressure of 300 kg/cm, punched to 3.7 inches, surface polished, and inserted in a 3.7 inch Zip disk cartridge equipped with internal liner. Prescribed structural members were added to obtain a 3.7 inch floppy disk.

[Embodiments 21 to 29]

The magnetic materials and polyurethane resins were changed as indicated in Table 5 and Embodiments 21 to 29 were obtained by the same methods as in Embodiment 20.

COMPARATIVE EXAMPLES 7 TO 11

The magnetic materials and polyurethane resins were changed as indicated in Table 5 and Comparative Examples 7 to 11 were obtained by the same methods as in Embodiment 20.

[Measurement Methods]

(1) Error Rate (Initial, After Storage)

A signal was recorded on a tape medium by the 8-10 conversion PR1 equalization method at a temperature of 23° C. and at 50 percent relative humidity, and measurement was conducted with a DDS drive. For the disk medium, the signal was recorded on the disk by the (2, 7) RLL modulation method and measurement was conducted. The error rate was measured again in the same manner following storage for one week at 50° C. at a relative humidity of 80 percent.

(2) Magnetic Layer Surface Roughness Ra

The center average roughness Ra was obtained by optical interference method with a cutoff of 0.25 μm with a digital optical profimeter (made by WYKO Co.).

(3) Calender Formability

Calender formability was evaluated by calculating the values of Ra, c/Ra, t from the magnetic layer surface roughness Ra, t after coating and the magnetic layer surface roughness Ra, c after calendaring obtained by method (2) above. The smaller the values of Ra, c/Ra, t, the greater the calendering formability.

TABLE 1

| Composition (mass parts) | | Synthesis No. | | | | | | | | |
|---|---|---|---|---|---|---|---|---|---|---|
| | | PUA-1 | PUA-2 | PUa-3 | PUB-1 | PUB-2 | PUB-3 | PUb-4 | PUC-1 | PUc-2 |
| Polyol | Polyether A | 40.0 | | 40.0 | | | | | | |
| | Polyether b | | 40.0 | | | | | | | |
| | Polyester A | | | | 45.0 | 45.0 | 45.0 | 45.0 | | |
| | Dimer diol | | | | | | | | 15.0 | 15.0 |
| Chain extending agent | HBpA | 22.0 | 22.0 | 22.0 | | | | | 35.0 | 35.0 |
| | 2-ethyl-2-butyl-1,3-puropanediol | | | | 10.0 | 10.0 | | 10.0 | | |
| | 1,6-hexanediol | | | | | | 6.8 | | | |
| Polar group-containing diol | DEIS | 12.0 | 12.0 | 2.0 | 12.0 | 20.0 | 12.0 | 2.0 | 12.0 | 2.0 |
| Organic diisocyanate | MDI | 43.5 | 39.4 | 32.7 | 32.4 | 37.8 | 32.4 | 25.7 | 54.1 | 46.7 |
| Hydrophilic polar group | Quantity of —SO$_3$Na introduced (meq/g) | 0.287 | 0.297 | 0.058 | 0.339 | 0.498 | 0.350 | 0.068 | 0.290 | 0.057 |
| Number average molecular weight | | 42000 | 28000 | 42000 | 45000 | 62000 | 38000 | 53000 | 48000 | 32000 |

HBpA: hydrogenated bisphenol A (molecular weight: 240), Polyether A: polypropylene oxide adduct of bisphenol A (molecular weight: 1000). Polyether b: polypropylene oxide (molecular weight: 1000), Polyester A: adipic acid/neopentyl glycol = 73/52 (molecular weight: 1000), DEIS: ethylene oxide adduct of sulfoisophthalic acid, MDI: 4,4'-diphenylmethane diisocyanate

TABLE 2

| Composition of monomer unit (mass parts) | | Synthesis No. | | |
|---|---|---|---|---|
| | | PVC-1 | PVC-2 | pvc-3 |
| Vinyl chloride monomer | | 85.0 | 85.0 | 85.0 |
| Other radical polymerizable monomer | Glycidyl allyl ether | 10.0 | 10.0 | 10.0 |
| | 2-hydroxypropyl methacrylate | 5.0 | 5.0 | 5.0 |
| | Sodium p-styrenesulfonate | 8.0 | 6.0 | 3.0 |
| Hydrophilic polar group | Quantity of —$SO_3Na$ introduced (meq/g) | 0.336 | 0.247 | 0.127 |
| Number average molecular weight | | 43000 | 38000 | 41000 |

TABLE 3

Composition (mass percent) and molecular weight of acrylic resin monomer unit

| | | Molecular weight of monomer | Synthesis No. | | | | |
|---|---|---|---|---|---|---|---|
| | | | AC-1 | AC-2 | AC-3 | AC-4 | AC-5 |
| Aromatic ring-containing (meth)acrylate | Benzyl methacrylate | 176 | 70.00 | 50.00 | 50.00 | 50.00 | 30.00 |
| | Benzyl acrylate | 162 | 0.00 | 0.00 | 0.00 | 0.00 | 0.00 |
| Nitrogen-containing radical polymerizable unit | N,N-dimethylaminopropyl acrylamide | 184 | 0.00 | 0.00 | 29.44 | 0.00 | 46.00 |
| | N,N-isopropyl acrylamide | 127 | 0.00 | 0.00 | 0.00 | 27.3 | 0.00 |
| | Diacetoneacrylamide | 169 | 8.45 | 0.00 | 0.00 | 0.00 | 0.00 |
| | N-Vinyl pyrrolidone | 111 | 0.00 | 25.53 | 0.00 | 0.00 | 0.00 |
| Others | Metyl methacrylate | 100 | 16.55 | 14.61 | 15.56 | 17.70 | 19.00 |
| | 2-hydroxymetyl methacrylate | 130 | 5.00 | 5.00 | 5.00 | 5.00 | 5.00 |
| | Sodium p-sryrenesulfonate | 206 | 0.00 | 0.00 | 0.00 | 0.00 | 0.00 |
| | Sodium acrylamide-2-methylpropanesulfonate | 243 | 0.00 | 4.86 | 0.00 | 0.00 | 0.00 |
| | Phosphoethylmethacrylayte | 194 | 0.00 | 0.00 | 0.00 | 0.00 | 0.00 |
| | Sodium methacrylate | 108 | 0.00 | 0.00 | 0.00 | 0.00 | 0.00 |
| Polar group | Amino group content (meq/g) | | 0.00 | 0.00 | 1.60 | 2.15 | 2.50 |
| | Amide group content (meq/g) | | 0.50 | 2.50 | 1.60 | 2.15 | 2.50 |
| | Total of amino group and amide group (meq/g) | | 0.50 | 2.50 | 3.20 | 4.30 | 5.00 |
| | $SO_3Na$ group content (meq/g) | | 0.00 | 0.20 | 0.00 | 0.00 | 0.00 |
| | $PO(OH)_2$ group content (meq/g) | | 0.00 | 0.00 | 0.00 | 0.00 | 0.00 |
| | COONa group content (meq/g) | | 0.00 | 0.00 | 0.00 | 0.00 | 0.00 |
| Number average molecular weight | | | 96000 | 73000 | 125000 | 89000 | 125000 |

| | | Molecular weight of monomer | Synthesis No. | | | | |
|---|---|---|---|---|---|---|---|
| | | | AC-6 | AC-7 | AC-8 | AC-9 | AC-10 |
| Aromatic ring-containing (meth)acrylate | Benzyl methacrylate | 176 | 0.00 | 0.00 | 0.00 | 50.00 | 50.00 |
| | Benzyl acrylate | 162 | 70.00 | 0.00 | 0.00 | 0.00 | 0.00 |
| Nitrogen-containing radical polymerizable unit | N,N-dimethylaminopropyl acrylamide | 184 | 0.00 | 0.00 | 0.00 | 0.00 | 0.00 |
| | N,N-isopropyl acrylamide | 127 | 0.00 | 0.00 | 0.00 | 31.75 | 31.75 |
| | Diacetoneacrylamide | 169 | 0.00 | 0.00 | 1.69 | 0.00 | 0.00 |
| | N-Vinyl pyrrolidone | 111 | 0.00 | 0.00 | 0.00 | 0.00 | 0.00 |
| Others | Metyl methacrylate | 100 | 7.99 | 90.88 | 91.25 | 7.43 | 10.55 |
| | 2-hydroxymetyl methacrylate | 130 | 5.00 | 5.00 | 5.00 | 5.00 | 5.00 |
| | Sodium p-sryrenesulfonate | 206 | 0.00 | 4.12 | 2.06 | 0.00 | 0.00 |
| | Sodium acrylamide-2-methylpropanesulfonate | 243 | 17.01 | 0.00 | 0.00 | 0.00 | 0.00 |
| | Phosphoethylmethacrylayte | 194 | 0.00 | 0.00 | 0.00 | 5.82 | 0.00 |
| | Sodium methacrylate | 108 | 0.00 | 0.00 | 0.00 | 0.00 | 2.70 |
| Polar group | Amino group content (meq/g) | | 0.00 | 0.00 | 0.00 | 0.00 | 0.00 |
| | Amide group content (meq/g) | | 0.70 | 0.00 | 0.10 | 2.50 | 2.50 |
| | Total of amino group and amide group (meq/g) | | 0.70 | 0.00 | 0.10 | 2.50 | 2.50 |
| | $SO_3Na$ group content (meq/g) | | 0.70 | 0.20 | 0.10 | 0.00 | 0.00 |
| | $PO(OH)_2$ group content (meq/g) | | 0.00 | 0.00 | 0.00 | 0.30 | 0.00 |
| | COONa group content (meq/g) | | 0.00 | 0.00 | 0.00 | 0.00 | 0.25 |
| Number average molecular weight | | | 125000 | 123000 | 110000 | 148000 | 73000 |

TABLE 4

Embodiments and Comparative Examples employing ferromagnetic metal powder

| | Magnetic material | | Binder | | Error rate | | Magnetic layer surface roughness Ra | | |
|---|---|---|---|---|---|---|---|---|---|
| | Major axis length (nm) | Crystallite size (nm) | Magnetic layer | Nonmagnetic layer | Initial × $10^{-5}$ | After storage × $10^{-5}$ | After coating Ra,t (nm) | After calendering Ra,c (nm) | Calender formability Ra,c/Ra,t |
| Embodiment 1 | 10 | 8 | PUA-1 | PUA-1 | 0.07 | 0.1 | 4.2 | 2.1 | 0.50 |
| Embodiment 2 | 40 | 10 | PUA-1 | PUA-1 | 0.05 | 0.07 | 4 | 1.8 | 0.45 |
| Embodiment 3 | 60 | 12 | PUA-1 | PUA-1 | 0.03 | 0.04 | 3.9 | 1.7 | 0.44 |
| Embodiment 4 | 80 | 18 | PUA-1 | PUA-1 | 0.12 | 0.32 | 3.8 | 1.8 | 0.47 |
| Embodiment 5 | 60 | 12 | PUA-2 | PUA-2 | 0.15 | 0.21 | 4.2 | 2.3 | 0.55 |
| Embodiment 6 | 60 | 12 | PUA-1 | PUa-3 | 0.13 | 0.18 | 4 | 2.2 | 0.55 |
| Embodiment 7 | 60 | 12 | PUB-1 | PUB-1 | 0.03 | 0.1 | 3.8 | 1.8 | 0.47 |
| Embodiment 8 | 60 | 12 | PUB-2 | PUB-2 | 0.05 | 0.06 | 3.7 | 1.7 | 0.46 |
| Embodiment 9 | 60 | 12 | PUB-3 | PUB-3 | 0.11 | 0.16 | 4.3 | 2.4 | 0.56 |
| Embodiment 10 | 60 | 12 | PUC-1 | PUC-1 | 0.03 | 0.05 | 3.7 | 1.9 | 0.51 |
| Embodiment 11 | 60 | 12 | PVC-1 | PVC-1 | 0.04 | 0.06 | 3.9 | 1.9 | 0.49 |
| Embodiment 12 | 60 | 12 | PVC-2 | PVC-2 | 0.05 | 0.09 | 4.2 | 1.9 | 0.45 |
| Embodiment 13 | 60 | 12 | AC-1 | AC-1 | 0.12 | 0.15 | 4.3 | 2.2 | 0.51 |
| Embodiment 14 | 60 | 12 | AC-2 | AC-2 | 0.05 | 0.15 | 3.8 | 1.9 | 0.50 |
| Embodiment 15 | 60 | 12 | AC-3 | AC-3 | 0.04 | 0.08 | 3.6 | 1.7 | 0.47 |
| Embodiment 16 | 60 | 12 | AC-4 | AC-4 | 0.06 | 0.09 | 3.9 | 1.9 | 0.49 |
| Embodiment 17 | 60 | 12 | AC-5 | AC-5 | 0.05 | 0.09 | 3.8 | 1.7 | 0.45 |
| Embodiment 18 | 60 | 12 | AC-6 | AC-6 | 0.04 | 0.12 | 3.7 | 1.9 | 0.51 |
| Embodiment 19 | 60 | 12 | AC-7 | AC-7 | 0.16 | 0.28 | 4.5 | 2.4 | 0.53 |
| Comp. Ex. 1 | 100 | 20 | PUA-1 | PUA-1 | 0.85 | 1.1 | 4.9 | 3.2 | 0.65 |
| Comp. Ex. 2 | 60 | 12 | PUa-3 | PUa-3 | 1.1 | 1.3 | 5.2 | 3.6 | 0.69 |
| Comp. Ex. 3 | 60 | 12 | PUb-4 | PUb-4 | 1.6 | 2.3 | 5.3 | 3.8 | 0.72 |
| Comp. Ex. 4 | 60 | 12 | PUc-2 | PUc-2 | 1.8 | 2.6 | 5.1 | 3.5 | 0.69 |
| Comp. Ex. 5 | 60 | 12 | pvc-3 | pvc-3 | 1.9 | 3.5 | 5.2 | 3.3 | 0.63 |
| Comp. Ex. 6 | 60 | 12 | Ac-8 | Ac-8 | 2.8 | 3.1 | 5.8 | 3.6 | 0.62 |

TABLE 5

Embodiments and Comparative Examples employing hexagonal barium ferrite magnetic material

| | | Binder | | Error rate | | Magnetic layer surface roughness Ra | | |
|---|---|---|---|---|---|---|---|---|
| | Magnetic material plate diameter (nm) | Magnetic layer | Nonmagnetic layer | Initial × $10^{-5}$ | After storage × $10^{-5}$ | After coating Ra,t (nm) | After calendering Ra,c (nm) | Calender formability Ra,c/Ra,t |
| Embodiment 20 | 5 | PUA-1 | PUA-1 | 0.45 | 0.56 | 4.5 | 2.4 | 0.53 |
| Embodiment 21 | 25 | PUA-1 | PUA-1 | 0.35 | 0.37 | 4.1 | 2.1 | 0.51 |
| Embodiment 22 | 40 | PUA-1 | PUA-1 | 0.36 | 0.45 | 4 | 1.9 | 0.48 |
| Embodiment 23 | 25 | PUA-1 | PUa-3 | 0.42 | 0.53 | 4.2 | 2.1 | 0.50 |
| Embodiment 24 | 25 | PUB-1 | PUB-1 | 0.42 | 0.48 | 3.9 | 2.1 | 0.54 |
| Embodiment 25 | 25 | PUC-1 | PUC-1 | 0.42 | 0.52 | 3.9 | 2.2 | 0.56 |
| Embodiment 26 | 25 | AC-2 | AC-2 | 0.36 | 0.45 | 3.9 | 2.1 | 0.54 |
| Embodiment 27 | 25 | AC-3 | AC-3 | 0.42 | 0.56 | 3.8 | 2 | 0.53 |
| Embodiment 28 | 25 | AC-9 | AC-9 | 0.48 | 0.67 | 3.9 | 2.1 | 0.54 |
| Embodiment 29 | 25 | AC-10 | AC-10 | 0.43 | 0.59 | 3.7 | 1.9 | 0.51 |
| Comp. Ex. 7 | 50 | PUA-1 | PUA-1 | 3.5 | 4.6 | 5.3 | 3.5 | 0.66 |
| Comp. Ex. 8 | 25 | PUa-3 | PUa-3 | 4.6 | 6.9 | 5.6 | 3.7 | 0.66 |
| Comp. Ex. 9 | 25 | PUb-4 | PUb-4 | 5.8 | 7.5 | 6.2 | 3.9 | 0.63 |
| Comp. Ex. 10 | 25 | PUc-2 | PUc-2 | 5.3 | 6.5 | 6.4 | 3.9 | 0.61 |
| Comp. Ex. 11 | 25 | Ac-8 | Ac-8 | 7.5 | 9.5 | 6.3 | 3.9 | 0.62 |

(1) Table 4

Embodiments 1 to 5 and 7 to 19, in which ferromagnetic powder having an average major axis length and crystallite size falling within the range of the present invention were employed in the magnetic layer, and in which the binder of the present invention was employed in the magnetic layer and nonmagnetic layer, and Embodiment 6, in which the binder of the present invention was employed only in the magnetic layer, all exhibited good error rates, magnetic layer surface roughness, and calender formability. The error rates following storage were also low, and storage properties at elevated humidity and temperature were also good.

In Comparative Example 1, in which the binder of the present invention was employed in the magnetic layer and nonmagnetic layer but the major axis length and the crystallite size exceeded the range of the present invention, the error rate, magnetic layer surface roughness, and calender formability were all inferior to those of the embodiments. This was attributed to the use of large magnetic material, precluding good dispersion.

In Comparative Examples 2 to 6, in which the binder of the present invention was not employed in the magnetic layer and nonmagnetic layer, the error rate, magnetic layer surface roughness, and calender formability were all inferior to those of the embodiments. This was thought to have occurred because of the lack of good dispersion of microgranular magnetic material due to lack of the use of the binder of the present invention.

(2) Table 5

Embodiments 20 to 22 and 24 to 29, in which ferromagnetic hexagonal ferrite powder having an average plate diameter falling within the range of the present invention was employed in the magnetic layer and the binder of the present invention was employed in the magnetic layer and nonmagnetic layer, and Embodiment 23, in which the binder of the present invention was employed only in the magnetic layer, all exhibited good error rates, magnetic layer surface roughness, and calender formability. The error rates following storage were also low, and storage properties at elevated humidity and temperature were good.

In Comparative Example 7, in which the binder of the present invention was employed in the magnetic layer and nonmagnetic layer but the major axis length and the crystallite size exceeded the range of the present invention, the error rate, magnetic layer surface roughness, and calender formability were all inferior to those of the embodiments. This was attributed to the use of large magnetic material, precluding good dispersion.

In Comparative Examples 8 to 11, in which the binder of the present invention was not employed in the magnetic layer and in the nonmagnetic layer, the error rate, magnetic layer surface roughness, and calender formability were all inferior to those of the embodiments. This was thought to have occurred because of the lack of good dispersion of microgranular magnetic material due to lack of the use of the binder of the present invention.

The present invention can provide a magnetic recording medium affording good dispersion of microgranular ferromagnetic powder in the magnetic layer and good electromagnetic characteristics. Use of the binder of the present invention in the nonmagnetic layer results in good dispersion of nonmagnetic powder, making it possible to achieve a nonmagnetic layer of good surface smoothness. It is thus possible to improve the surface smoothness and electromagnetic characteristics of the thin magnetic layer positioned over the nonmagnetic layer.

The magnetic recording medium of the present invention undergoes little magnetic layer surface scraping, dirties heads little, and has good running stability in repeat running in high-density recording for digital video tape recorders. It has a good storage property at elevated humidity and temperature.

The present disclosure relates to the subject matter contained in Japanese Patent Application No. 2001-248641 filed on Aug. 20, 2001, which is expressly incorporated herein by reference in its entirety.

What is claimed is:

1. A magnetic recording medium comprising at least one magnetic layer comprising a ferromagnetic powder and a binder on a nonmagnetic support, wherein
said ferromagnetic powder is a ferromagnetic hexagonal ferrite powder having an average plate diameter of 5 to 40 nm, and
said binder comprises 0.25 to 0.65 meq/g of at least one polar group selected from $-SO_3M$, $-OSO_3M$, $-PO(OM)_2$, $-OPO(OM)_2$ and $-COOM$ (where M denotes a hydrogen atom, alkali metal or ammonium salt), and/or 0.5 to 5 meq/g of at least one polar group selected from $-CONR_1R_2$, $-NR_1R_2$ and $-NR_1R_2R_3^+$ (where $R_1$, $R_2$ and $R_3$ independently denote hydrogen atoms or alkyl groups).

2. The magnetic recording medium according to claim 1, wherein said binder is polyurethane resin (A) obtained by reacting a polyol having a molecular weight of 500 to 5,000, a cyclic structure and an alkylene oxide chain; a chain-extending agent in the form of a polyol having a molecular weight of 200 to 500 and a cyclic structure; and organic polyisocyanate.

3. The magnetic recording medium according to claim 1, wherein said binder is polyurethane resin (B) obtained by reacting a polyester polyol comprised of an aliphatic dibasic acid and an aliphatic diol having an alkyl branch side chain but not having a cyclic structure; a chain-extending agent in the form of an aliphatic diol having a branch alkyl side chain with three or more carbon atoms; and an organic cyanate compound.

4. The magnetic recording medium according to claim 1, wherein said binder is polyurethane resin (C) obtained by reacting a polyol compound having a cyclic structure and an alkyl chain comprising two or more carbon atoms with organic diisocyanate.

5. The magnetic recording medium according to claim 1, wherein said binder is a vinyl chloride copolymer comprising at least 75 to 95 mass percent of vinyl chloride monomer units.

6. The magnetic recording medium according to claim 1, wherein said binder is an acrylic copolymer comprising 1 to 75 mass percent of nitrogen-containing radical polymerizable monomer units, 1 to 75 mass percent of aromatic ring-containing radical polymerizable monomer units, and other radical polymerizable monomer units in a total of 100 mass percent.

7. The magnetic recording medium according to claim 1, wherein said ferromagnetic hexagonal ferrite powder has an average plate diameter of 10 to 35 nm.

8. The magnetic recording medium according to claim 1, wherein said ferromagnetic hexagonal ferrite powder has an average plate diameter of 15 to 30 nm.

9. The magnetic recording medium according to claim 1, wherein said binder comprises 0.3 to 0.5 meq/g of at least one polar group selected from $-SO_3M$, $-OSO_3M$, $-PO(OM)_2$, $-OPO(OM)_2$ and $-COOM$.

10. The magnetic recording medium according to claim 1, wherein said binder comprises 1 to 4 meq/g of at least one polar group selected from $-CONR_1R_2$, $-NR_1R_2$ and $-NR_1R_2R_3^+$.

11. The magnetic recording medium according to claim 1, wherein said binder comprises 1.5 to 3.5 meq/g of at least one polar group selected from $-CONR_1R_2$, $-NR_1R_2$ and $-NR_1R_2R_3^+$.

12. The magnetic recording medium according to claim 1, wherein said magnetic recording medium further comprises a lower nonmagnetic coating layer comprising a binder and a nonmagnetic powder on a nonmagnetic support.

* * * * *